US008301280B2

(12) United States Patent
Sekido et al.

(10) Patent No.: US 8,301,280 B2
(45) Date of Patent: Oct. 30, 2012

(54) AUDIO SIGNAL PROCESSING SYSTEM

(75) Inventors: Yuichi Sekido, Hamamatsu (JP); Tatsuya Umeo, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 672 days.

(21) Appl. No.: 12/401,557

(22) Filed: Mar. 10, 2009

(65) Prior Publication Data

US 2009/0234477 A1 Sep. 17, 2009

(30) Foreign Application Priority Data

Mar. 11, 2008 (JP) ................................ 2008-061917
Mar. 11, 2008 (JP) ................................ 2008-061918

(51) Int. Cl.
*G06F 17/00* (2006.01)

(52) U.S. Cl. ........................................................ 700/94

(58) Field of Classification Search .................... 700/94; 381/119; 369/4
See application file for complete search history.

(56) References Cited

U.S. PATENT DOCUMENTS

2002/0193894 A1* 12/2002 Terada et al. .................. 700/94

FOREIGN PATENT DOCUMENTS

EP 1 939 857 A2 7/2008

OTHER PUBLICATIONS

"Cubase 4 Operation Manual," Steinberg Media Technologies GmbH, Oct. 16, 2006.

European Search Report mailed Aug. 23, 2012, for EP Application No. 09154847.9, six pages.

Yamaha (2003). Digital Mixing Studio 01X Owner's Manual, pp. 1-154. (submitted in three parts.).

* cited by examiner

*Primary Examiner* — Andrew C Flanders
(74) *Attorney, Agent, or Firm* — Morrison & Foerster LLP

(57) ABSTRACT

In an audio signal processing device having a plurality of tracks recording an audio signal supplied from any of a plurality of buses, when a track is selected in accordance with an operation by a user, a bus supplying the audio signal to the track is searched, and when an appropriate bus is found and it is judged affirmative that a signal input device having an indicator whose display contents can be controlled by the audio signal processing device supplies the audio signal to the found bus, control data for making an indicator corresponding to a transmission port supplying the audio signal to the found bus perform a display indicating that the transmission port is connected to the selected track.

9 Claims, 15 Drawing Sheets

AUDIO SIGNAL PROCESSING SYSTEM

BACKGROUND OF THE INVENTION

1. Field of the Invention

The invention relates to an audio signal processing system provided with a signal input device transmitting a plurality of respective audio signals inputted from the outside to an audio signal processing device through a plurality of transmission ports and the audio signal processing device provided with a plurality of tracks for recording the audio signals, and also relates to computer readable medium embedding a program containing program instructions executable by a computer and a causing the computer to function as an audio signal processing device which can be included in the audio signal processing system.

2. Description of the Related Art

Conventionally, various types of DAW (Digital Audio Workstation) applications are known as a program for making a computer such as a PC serve as an audio signal processing device provided with a plurality of tracks for recording audio signals.

Further, a recording of audio signals supplied from an external device is performed on a track realized by the DAW application by connecting a PC activating the DAW application and a signal input device transmitting audio signals from a plurality of ports and inputting the signals into an external device (the PC here).

Incidentally, when an audio signal inputted from an external device is recorded by the DAW application, there is a need to correspond a port receiving the signal to a track used for the recording. However, there are wide variations in hardware of a computer which executes the DAW application, and various types of hardware such as a terminal LSI and an expansion card are also used as input/output interfaces.

When audio waveform data is inputted/outputted, there is a case of using an audio input/output terminal of an LSI on a motherboard, and there is also a case of using a peripheral device provided with an input/output terminal connected by a USB (Universal Serial Bus) or an IEEE 1394 (Institute of Electrical and Electronic Engineers 1394). In the above cases, a name of a port by which a computer receives the audio waveform data becomes a name in accordance with the LSI or the peripheral device providing the audio input/output terminal.

In order to enable to set an input source of waveform data with respect to each track using a fixed name under such a situation, the conventional DAW application is provided with a "virtual bus" function.

This function is a function in which when audio waveform data inputted from an input terminal (which may be a terminal of a peripheral device) is received by any port at the time of inputting data, a bus (virtual bus) is first formed and is connected to the port, and the formed bus is designated to a track used for recording, as an input source of waveform data.

According to this function, a bus which can be formed and freely named by a user can be designated as an input source for a track. Therefore, even when set data of a track prepared in a certain hardware environment is used in another hardware environment, if only a connection between a port and a bus is set in accordance with the hardware environment, the setting of the track can be used without any change being made. Accordingly, by adopting the virtual bus function, it is possible to enhance an applicability and convenience of a system by facilitating a conversion of the set data of the track.

Such a DAW application is disclosed in, for example, the following Document 1.

Document 1: "Cubase (registered trademark) 4 operation manual", [online], 2007, Steinberg Media Technologies GmbH., [Retrieved on Mar. 11, 2008] Internet <URL: http://www.steinberg.net/1172_0.html>

SUMMARY OF THE INVENTION

Incidentally, when the virtual bus function as described above is adopted, there is a problem that a correspondence between a port accepting an input of audio waveform data and a track for recording the waveform data or a correspondence between a terminal (of an external device) into which an audio signal is inputted and a track for recording the audio signal becomes complicated since a bus is interposed therebetween.

Further, a setting of input source with respect to each track has been conventionally performed based on a name of a bus, so that a user has to determine that a bus to be set here as an input source for the track corresponds to which port or input terminal of a device being a physical signal supply source, and thus a difficulty in the setting has been high.

Note that this problem similarly occurs also when a port is directly set as an input source for the track without using the virtual bus function.

Further, this problem may similarly occur also in an audio signal processing device configured by using dedicated hardware.

An object of this invention is to solve such problems and to enable, even when audio signals transmitted from an external device are recorded in a plurality of tracks of an audio signal processing device, to easily recognize a correspondence between the tracks and the device being a signal supply source.

Furthermore, when the virtual bus function as described above is adopted, there is also a problem that complicated setting operations are necessary for recording a voice inputted from a specific input terminal (or audio waveform data transmitted from a specific port of the external device), that is, operations as follows are necessary: firstly generate a bus; then connect the generated bus with a port through which the waveform data regarding the voice is accepted; and finally set input source of the track to the generated bus. Accordingly, there has been a demand for a simpler operation.

This problem may similarly occur also in an audio signal processing device configured by using dedicated hardware.

Another object of this invention is to solve such problems and to realize setting on a signal transmission path from an audio signal source to a track used to record the signal by simple operation, even when the audio signal processing device is provided with buses inputting audio signals transmitted from an external device and the bus should be set as an input source of the signals for a track which records the audio signal.

To attain the above object, an audio signal processing system of the invention includes: a signal input device that inputs a plurality of audio signals from outside and transmits the plurality of audio signals to an audio signal processing device through a plurality of transmission ports in the signal input device; and an audio signal processing device including: a plurality of reception ports each of which receives an audio signal transmitted from the signal input device; a plurality of buses each of which is connected to one of the plurality of reception ports and inputs the audio signal received by the one reception port; and a plurality of tracks each of which records the audio signal supplied from one of the plurality of buses, wherein the signal input device further includes: display devices corresponding to the plurality of transmission ports;

and a display controller that controls the display devices according to control data received from the audio signal processing device, and wherein the audio signal processing device further includes: a memory that stores data indicating, regarding each one of the plurality of buses, one of the plurality of reception ports to which the one bus is connected, and one transmission port of the input device through which an audio signal received by the one reception port is transmitted by the input device; a selecting device that selects one of the plurality of the tracks according to an operation by a user; a searching device that, when the selecting device selects a track, searches any one bus which supplies the audio signal to the selected track; and a control data transmitter that, when the searching device finds a bus which supplies the audio signal to the selected track, judges if a reception port connected to the found bus receives an audio signal transmitted through one transmission port of the signal input device or not based on the data stored in the memory and, when the judgment is affirmative, transmits, to the signal input device, first control data which instructs the display controller in the signal input device to control one of the display devices corresponding to the one transmission port to indicate that the one transmission port is connected to the selected track.

In such an audio signal processing system, it is preferable that the audio signal processing device further includes: a loading device that reads a project data including data of tracks and setting data of reception ports and buses, prepares the tracks, the reception ports, and the buses which connects the tracks and the reception ports based on the read project data; a second searching device that, when the loading device prepares the tracks, the reception ports, and the buses, searches any buses which supply audio signals to the prepared tracks; and a second control data transmitter that, when the second searching device finds one or more buses, judges if one or more reception ports connected to the found buses receive one or more audio signals transmitted through one or more transmission port of the signal input device or not based on the data stored in the memory and, when the judgment is affirmative, transmits, to the signal input device, second control data which instructs the display controller in the signal input device to control one or more display devices corresponding to the one or more transmission ports to indicate that the one or more transmission ports are connected to the prepared tracks.

Alternatively, it is also preferable that the audio signal processing device further includes a changing device that changes an audio signal supply source for a track from one bus to another bus according to a user operation by stopping the one bus from supplying an audio signal to the track and start the other bus supplying an audio signal to the track; and a third control data transmitter that, in response to the change of the audio signal supply source for the track by the changing device, (a) judges, based on the data stored in the memory, if the one bus is connected to any reception port receiving an audio signal transmitted through a first transmission port of the signal input device or not and if the one bus no longer supplies the audio signal to any of the plurality of tracks after the change or not, and, when both of the two judgments are affirmative, transmits, to the signal input device, third control data which instructs the display controller in the signal input device to control one of the display devices corresponding to the first transmission port to indicate that the first transmission port is no longer connected to any of the tracks, and (b) judges, based on the data stored in the memory, if the other bus is connected to any reception port receiving an audio signal transmitted through a second transmission port of the signal input device or not, and, when the judgment is affirmative, transmits, to the signal input device, fourth control data which instructs the display controller in the signal input device to control one of the display devices corresponding to the second transmission port to indicate that the second transmission port is newly connected to the track.

Another audio signal processing system of the invention includes: a signal input device that inputs a plurality of audio signals from outside and transmits the plurality of audio signals to an audio signal processing device through a plurality of transmission ports in the signal input device; and an audio signal processing device including: a plurality of reception ports each of which receives an audio signal transmitted from the signal input device; a plurality of buses each of which is connected to one of the plurality of reception ports and inputs the audio signal received by the one reception port; and a plurality of tracks each of which records the audio signal supplied from one of the plurality of buses, wherein the signal input device further includes: controls corresponding to each of the plurality of transmission ports in the signal input device; and an operation data transmitter that, in response to an operation on one of the controls by a user, transmits operation data indicating the operation on the one control, and wherein the audio signal processing device further including: a selecting device that selects one of the plurality of the tracks according to an operation by a user; a searching device that, when receiving, from the signal input device, the operation data indicating an operation on one control corresponding to one transmission port while one of the plurality of tracks is selected by the selecting device, searches any one bus connected to any one reception port which receives the audio signal transmitted through the one transmission port in the signal input device, among the buses existing at the moment; a first setting device that, when the searching device finds an existing bus connected to a reception port which receives the audio signal transmitted through the one transmission port in the signal input device, connects the selected track to the found bus to supply the audio signal from the one transmission port in the signal input device to the selected track; and a second setting device that, when the searching device cannot find an existing bus, newly creates a bus, connects the created bus to a reception port which receives the audio signal transmitted through the one transmission port in the signal input device, and connects the selected track to the created bus to supply the audio signal from the one transmission port in the signal input device to the selected track.

Still another audio signal processing system of the invention includes: a signal input device that inputs a plurality of audio signals from outside and transmits the plurality of audio signals to an audio signal processing device through a plurality of transmission ports in the signal input device, some of the plurality of transmission ports are solely set in monaural mode and others of the plurality of transmission ports are paired and set in stereo mode, a monaural audio signal being transmitted through the port in the monaural mode, while two audio signals in stereo being transmitted through the paired transmission ports in the stereo mode; and an audio signal processing device including: a plurality of reception ports each of which receives an audio signal transmitted from the signal input device; a plurality of monaural buses each of which is connected to one of the plurality of reception ports and inputs one audio signal transmitted through the port in the monaural mode and received by the one reception port; a plurality of stereo buses each of which is connected to two of the plurality of reception ports and input two audio signals transmitted through the paired transmission ports in the stereo mode and received by the two reception ports; a plurality of monaural tracks each of which records one audio signal supplied from one of the plurality of monaural buses; and a plurality of stereo tracks each of which records two audio signals supplied from one of the plurality of stereo buses, wherein the signal input device further includes: controls corresponding to each of the plurality of transmission ports in the signal input device; and an operation data transmitter that, in response to an operation on one of the controls by a user, transmits operation data indicating the operation on the one control, and wherein the audio signal processing device further includes: a selecting device that selects one of the monaural tracks and the stereo tracks according to an operation by a user; a first searching device that, when receiving, from the signal input device, the operation data indicating an operation on one control corresponding to one transmission port while one of the monaural tracks is selected by the selecting device, searches any one monaural bus connected to any one reception port which receives the audio signal transmitted through the one transmission port in the signal input device, among the monaural buses existing at the moment; a first setting device that, when the searching device finds a monaural bus connected to a reception port which receives the audio signal transmitted through the one transmission port in the signal input device, connects the selected monaural track to the found monaural bus to supply the audio signal from the one transmission port in the signal input device to the selected monaural track; a second setting device that, when the searching device cannot find a monaural bus, newly creates a monaural bus, instructs the input device to set the one transmission port in the monaural mode, connects the created monaural bus to a reception port which receives the audio signal transmitted through the one transmission port in the signal input device, and connects the selected monaural track to the created monaural bus to supply the audio signal from the one transmission port in the signal input device to the selected monaural track; a second searching device that, when receiving, from the signal input device, the operation data indicating an operation on one control corresponding to one transmission port while one of the stereo tracks is selected by the selecting device, searches any one stereo bus connected to any two reception ports which receive the audio signal transmitted through paired transmission ports including the one transmission port in the signal input device, among the stereo buses existing at the moment; a third setting device that, when the searching device finds a stereo bus connected two reception ports which receive the two audio signals transmitted through the paired transmission ports in the signal input device, connects the selected stereo track to the found stereo bus to supply the two audio signals from the paired transmission port in the signal input device to the selected stereo track; and a fourth setting device that, when the searching device cannot find a stereo bus, newly creates a stereo bus, instructs the input device to pair the one transmission port with another transmission port and to set the paired transmission ports in the stereo mode, connects the created stereo bus to two reception ports which receive the two audio signals transmitted through the paired transmission ports in the signal input device, and connects the selected stereo track to the created stereo bus to supply the two audio signals from the paired transmission ports in the signal input device to the selected stereo track.

In such an audio signal processing system, it is preferable that, in a case where an audio signal transmitted from the another transmission port to be paired with the one transmission port in the signal input device is already inputted to any of the monaural buses, the fourth setting device does not operate.

Further, still another audio signal processing system of the invention includes: a signal input device that inputs a plurality of audio signals from outside and transmits the plurality of audio signals to an audio signal processing device through a plurality of transmission ports in the signal input device, some of the plurality of transmission ports are solely set in monaural mode and others of the plurality of transmission ports are paired and set in stereo mode, a monaural audio signal being transmitted through the port in the monaural mode, while two audio signals in stereo being transmitted through the paired transmission ports in the stereo mode; and an audio signal processing device including: a plurality of reception ports each of which receives an audio signal transmitted from the signal input device; a plurality of monaural buses each of which is connected to one of the plurality of reception ports and inputs one audio signal transmitted through the port in the monaural mode and received by the one reception port; a plurality of stereo buses each of which is connected to two of the plurality of reception ports and input two audio signals transmitted through the paired transmission ports in the stereo mode and received by the two reception ports; a plurality of monaural tracks each of which records one audio signal supplied from one of the plurality of monaural buses; and a plurality of stereo tracks each of which records two audio signals supplied from one of the plurality of stereo buses, wherein the signal input device further includes: controls corresponding to each of the plurality of transmission ports in the signal input device; and an operation data transmitter that, in response to an operation on one of the controls by a user, transmits operation data indicating the operation on the one control, and wherein the audio signal processing device further includes: a selecting device that selects one of the monaural tracks and the stereo tracks according to an operation by a user; a searching device that, when receiving, from the signal input device, the operation data indicating an operation on one control corresponding to one certain transmission port while one of the monaural tracks and the stereo tracks is selected by the selecting device, searches any one monaural bus or stereo bus connected to any one or two reception ports which receives the one or two audio signals transmitted through the one transmission port or the paired transmission ports including the one transmission port in the signal input device, among the monaural buses and the stereo buses existing at the moment; a first setting device that, when the searching device finds a monaural or stereo bus connected one or two reception ports which receives the one or two audio signals transmitted through the one transmission port or the paired transmission ports in the signal input device, connects the selected one track to the found monaural or stereo bus to supply the one or two audio signals from the one transmission port or the paired transmission ports in the signal input device to the selected one track; and a second setting device that, when the searching device cannot find a monaural or stereo bus, newly creates a monaural or stereo bus, connects the created monaural or stereo bus to one or two reception ports which receives the audio signal transmitted through the one transmission port or the paired two transmission ports in the signal input device, and connects the selected one track to the created monaural or stereo bus to supply the one or two audio signals from the one transmission port or the paired transmission ports in the signal input device to the selected one track, wherein the monaural bus being created in case where the one certain transmission port is in the monaural mode while the stereo bus being created in case where the one certain transmission port is paired with another transmission port and in the stereo mode.

A computer readable medium of the invention contains program instructions executable by a computer and causes the computer to function an audio signal processing device included in one of above described audio processing systems or capable of forming one of above described audio processing systems.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the invention will be concretely described with reference to the drawings.

Figure 1:
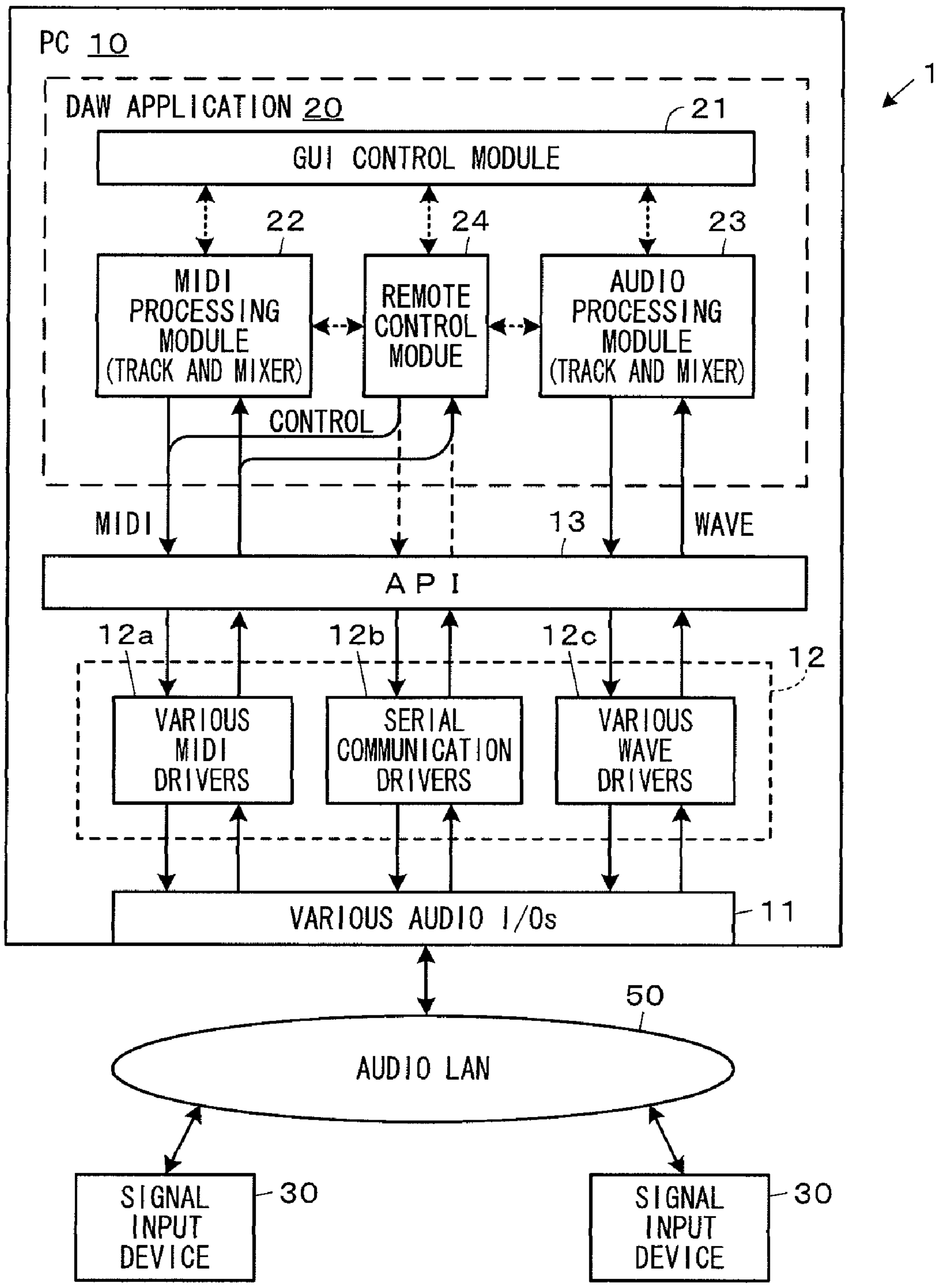
FIG. 1 is a block diagram showing a functional configuration of a PC and a signal input device constituting an audio signal processing system as an embodiment of an audio signal processing system of this invention.

First, FIG. 1 shows a functional configuration of a PC and a signal input device constituting an audio signal processing system as an embodiment of an audio signal processing system of the invention. Note that FIG. 1 simply shows functions of parts related to audio signal processing.

As shown in FIG. 1, according to this embodiment, a PC 10 as a general-purpose computer and a signal input device 30 are connected so that they can perform data transmission/reception via an audio LAN 50 and constitute an audio signal processing system 1.

Among the above, the PC 10 includes various audio I/Os (input/output units) 11, various audio I/O drivers 12, an API (Application Program Interface) 13 and a DAW (Digital Audio Workstation) application 20. Except for the various audio I/Os 11, those are functions realized by software. Description regarding hardware of the PC 10 will be given later.

The various audio I/Os 11 are interfaces for transmitting/receiving data such as audio waveform data, MIDI (Musical Instruments Digital Interface: trademark) performance data and control data such as a command instructing a particular operation to a destination device. Concretely, for example, it is possible to employ an interface of IEEE 1394 standard for mLAN communications, which is an audio data communication standard proposed by Yamaha Corporation. Other than that, it is also conceivable to use an interface of USB standard or Ethernet (registered trademark) standard.

The various audio I/O drivers 12 have functions of driving the various audio I/Os 11 to make them communicate with an external device including the signal input device 30, which are realized by making a CPU execute a driver program. Here, concretely, various MIDI drivers 12*a* with which transmission/reception of MIDI data is performed, serial communication drivers 12*b* with which serial communication of arbitrary data is performed, and various WAVE drivers 12*c* with which transmission/reception of audio waveform data (hereinafter, if it is simply referred to as "waveform data", it indicates the audio waveform data) being a digital audio signal, are prepared.

These drivers are activated when the PC 10 is turned on, and control input/output operations of the various audio I/Os. Further, when it is detected that an external device is connected to the audio LAN 50, an exchange of control signal is performed among the corresponding driver, the external device and other devices, and a virtual communication path according to a function of the external device is set between the PC 10 and the external device.

When a virtual communication path for serial communication is set, a serial communication port included in the connected external device side is connected to the virtual communication path, and at the PC 10 side, a serial communication port is created by the serial communication driver 12*b* and connected to the virtual communication path. When a virtual communication path for waveform data communication is set, a waveform communication port (transmission port or reception port) included in the external device is connected to the virtual communication path, and at the PC 10 side, a waveform data communication port (reception port or transmission port) is created by the WAVE driver 12*c* and connected to the virtual communication path. When a virtual communication path for MIDI communication is set, MIDI communication ports are respectively connected at both the external device side and the PC 10 side in the same manner.

The API 13 being a program interface provided by an OS (Operating System) can be used when operating an application program. Data transmitted/received by a driver among the various audio I/O drivers 12 is provided from or supplied to a bus and the like of the DAW application 20 via the API 13.

The DAW application 20 has a function of, according to a user's operation, recording inputted waveform data or performance data, reading the recorded waveform data or performance data to output (reproduce), generating waveform data based on performance data (automatic performance), or performing mixing, equalizing, effect addition or the like on the waveform data (signal processing). These functions are realized by making a CPU of the PC 10 execute an appropriate application program.

More concretely, the DAW application 20 includes a GUI (Graphical User Interface) control module 21, a MIDI processing module 22, an audio processing module 23 and a remote control module 24.

The GUI control module 21 has functions of displaying a GUI on a display to accept a user's operation and displaying various pieces of information of the DAW application 20, such as set contents, operation states and contents of data being a processing target.

The MIDI processing module 22 has a function of performing processing such as recording, reproducing and automatic performance on MIDI performance data.

The audio processing module 23 has a function of performing processing such as recording, reproducing and signal processing on audio waveform data.

The recording and reproducing in the MIDI processing module 22 and the audio processing module 23 can be performed by a plurality of tracks on a track-to-track basis. In other words, pieces of data of a plurality of channels, which are inputted from the signal input device 30 or the like, can be individually inputted into different tracks to record, or pieces of data reproduced in the plurality of tracks can be outputted to destinations individually set for the respective tracks.

Further, although not clearly illustrated in FIG. 1, the DAW application 20 is provided with a bus (virtual bus) for supplying waveform data received by the various audio I/Os 11 to a track. The bus has a function of receiving and inputting waveform data transmitted by an external device through a specific port and received by a specific reception port at the PC 10 side from the API 13 in accordance with a correspondence designated by later-described project data, and supplying the inputted waveform data to a specific track. When data is outputted from a track, the data to be transmitted is supplied to a transmission port via a bus, in the same manner.

Note that it is possible to design such that a level, a frequency characteristic, a sound image localization position or the like of the waveform data received from the API 13 can be adjusted at the bus.

The remote control module 24 has a function of interpreting a command sent from an external device to change set contents in the DAW application 20, to start or stop operations, or to perform other operations according to the interpreted contents. Further, on the other hand, the remote control module 24 also has a function of transmitting, when a particular operation is performed on the DAW application 20 at the PC 10 side, control data according to the operation to the external device to make the external device operate according to the control data.

Note that the control data may also be transferred through a serial communication using the serial communication drivers 12b. However, in this case, the control data is generated as MIDI data and is transferred via control data communication ports prepared by the various MIDI drivers 12*a*.

Next, hardware configurations of the aforementioned PC 10 and signal input device 30 will be described.

Figure 2:
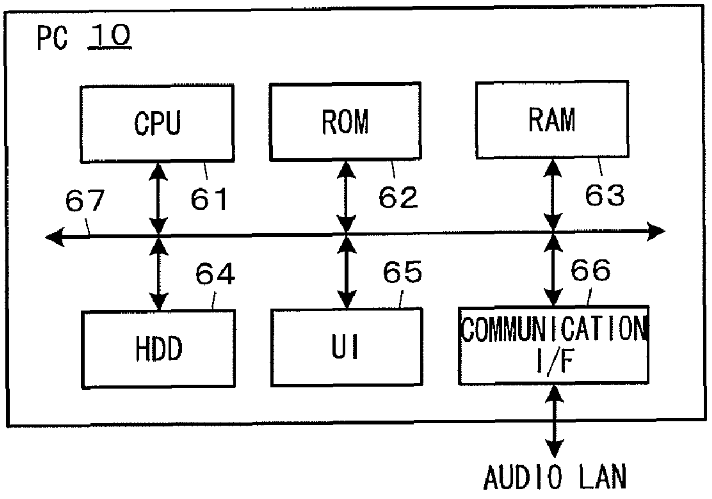
FIG. 2 is a diagram showing a hardware configuration of the PC shown in FIG. 1.

First, FIG. 2 shows the hardware configuration of the aforementioned PC 10.

The PC 10 can be configured by using a publicly-known PC as hardware. For instance, the PC 10 can be configured such that it includes a CPU 61, a ROM 62, a RAM 63, an HDD (hard disk drive) 64, a UI (user interface) 65 and a communication interface (I/F) 66 which are connected by a system bus 67.

By making the CPU 61 execute an appropriate program stored in the ROM 62 or the HDD 64, it is possible to realize functions of the aforementioned respective modules. Further, the UI 65 is an interface such as a display, a keyboard and a mouse for showing information to a user and accepting an operation from the user. It is of course possible to use devices external of the PC 10 as these interfaces.

Further, the communication I/F 66 includes the various audio I/Os 11 shown in FIG. 1.

Figure 3:
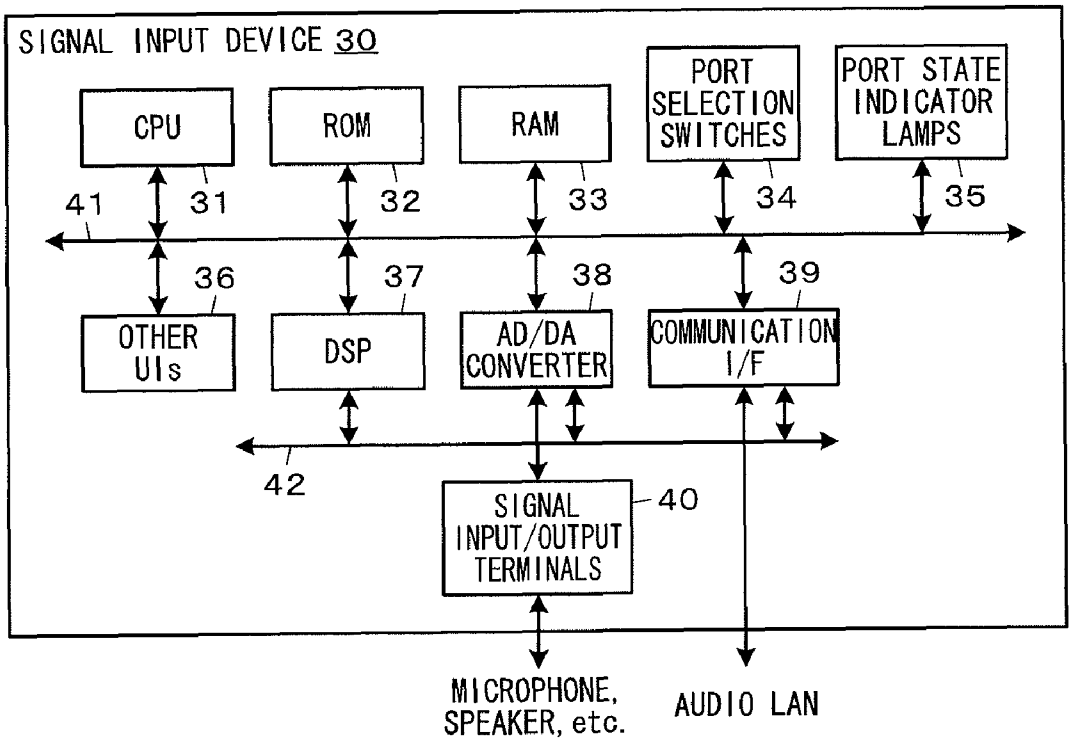
FIG. 3 is a diagram showing a hardware configuration of the signal input device shown in FIG. 1.
Figure 4:
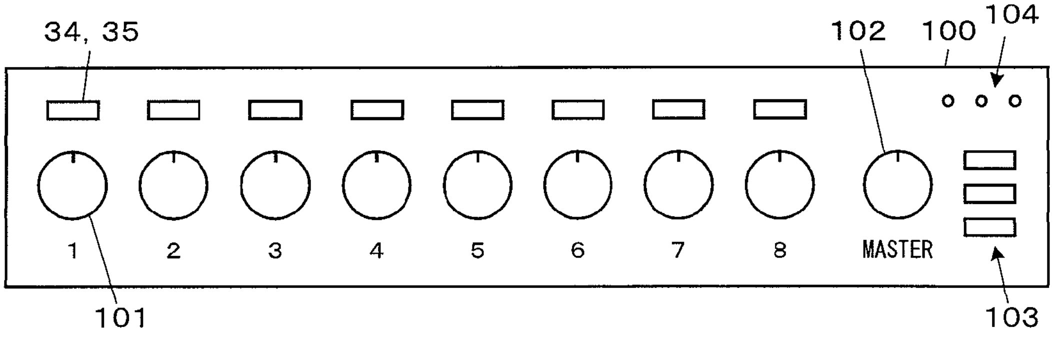
FIG. 4 is a diagram showing a configuration of an operation panel of the signal input device shown in FIG. 1.

Next, the hardware configuration of the signal input device 30 is shown in FIG. 3. Further, a configuration of an operation panel of the signal input device 30 is shown in FIG. 4.

The signal input device 30 has a function of performing at least simple signal processing such as level adjustment on audio signals inputted through cables connected to signal input/output terminals 40 to transmit through a plurality of ports and inputting the transmitted audio signals into an external device such as the PC 10.

As shown in FIG. 3, the signal input device 30 includes a CPU 31, a ROM 32, a RAM 33, port selection switches 34, port state indicator lamps 35, other UIs 36, a DSP (digital signal processor) 37, an AD/DA converter 38 and a communication I/F 39 which are connected by a system bus 41. Further, the DSP 37, the AD/DA converter 38 and the communication I/F 39 are connected also by an audio bus 42 for transmitting waveform data. The signal input/output terminals 40 are connected to the AD/DA converter 38.

Among the above, functions of the CPU 31, the ROM 32 and the RAM 33 are similar to those in the aforementioned PC 10, and when the CPU 31 executes an appropriate program stored in the ROM 32, various control functions such as communication via the communication I/F 39, signal processing performed by the DSP 37, detection of operation of the port selection switches 34, lighting control of the port state indicator lamps 35 and later-described mode setting of ports are realized.

The port selection switches 34 are controls provided so as to correspond to respective ports used for transmitting waveform data to an external device, and are used for selecting the respective ports. Hereinafter, if it is referred to as "switch" of the signal input device 30, it indicates the port selection switch 34, except when especially noted.

The port state indicator lamps 35 are indicators provided so as to correspond to the respective ports used for transmitting waveform data to the external device, and are used for a display regarding states of the respective ports, especially a connection state between the ports and the external device. Hereinafter, if it is referred to as "lamp" of the signal input device 30, it indicates the port state indicator lamp 35, except when especially noted.

Here, the signal input device 30 is provided with eight ports used for transmitting waveform data to the external device in accordance with the number of signal input terminals, and on an operation panel 100, the port selection switches 34 and the port state indicator lamps 35 corresponding to the first to eighth ports are provided as switches having light emitting diode lamps included therein, as shown in FIG. 4.

The others UIs 36 are controls and indicators for setting processing contents in the DSP 37 and setting/displaying modes of respective ports. Here, as shown in FIG. 4, the other UIs 36 include level knobs 101 for individually setting levels of waveform data transmitted from the respective ports, a master level knob 102 for setting an output signal level as a whole device, and control element groups 103 and lamp groups 104 used for performing other various operations and displays.

The DSP 37 is an audio signal processor performing level adjustment on waveform data inputted/outputted into/from an external device and performing panning when a port is in a stereo mode. Note that it is also possible that the DSP 37 conducts signal processing other than the above.

The AD/DA converter 38 has a function of converting an analogue audio signal inputted from the signal input/output terminal 40 into digital waveform data or converting waveform data received from an external device via the communication I/F 39 into an analogue audio signal to supply to the signal input/output terminal 40.

The signal input/output terminals 40 are terminals to input/output analogue audio signals via cables connected thereto. Further, it is of course possible to provide a terminal to input/output a digital audio signal, and in this case, it is only required to connect the terminal to the audio bus 42 without interposing the AD/DA converter 38 therebetween.

Further, in this case, the input/output terminal and a port is corresponded one-to-one, in which, for example, one port for transmitting signal is provided with respect to one signal input terminal, and waveform data relating to an analogue audio signal inputted from the terminal is outputted from the corresponding port.

The communication I/F 39 is an interface for transmitting/receiving waveform data to/from an external device such as the PC 10 by being connected to the audio LAN 50, and an interface of appropriate standard can be adopted, similar to the case of the PC 10.

Further, in the signal input device 30, respective output ports can be operated in either monaural mode or stereo mode. In the monaural mode, monaural waveform data is transmitted from each port, and in the stereo mode, pieces of stereo waveform data of two channels of L and R are transmitted from two ports being paired with each other. At this time, regarding output signals from the paired ports, level adjustment thereof can be collectively conducted and panning adjustment can be performed thereon. Further, when the stereo mode is applied, the adjacent (2n-1)-th port and 2n-th port (n is a natural number) are set to be a pair (stereo pair) in this embodiment.

This embodiment is characterized by a function regarding a setting and a display of data transmission paths when pieces of waveform data transmitted from a plurality of ports by the signal input device 30 such as described above and inputted into the PC 10 are recorded in a plurality of tracks of the DAW application 20. Accordingly, this function will be described hereinbelow.

First, description regarding transmission paths of audio signals from when they are inputted from signal input terminals of the signal input device 30 until when they are inputted into tracks of the DAW application 20 used for recording will be made with reference to FIG. 5. Note that although the DAW application 20 in the PC 10 includes transmission paths other than the ones shown in FIG. 5, parts related to the characteristic of this embodiment are extracted and shown here.

First, at the signal input device 30 side, since signal input terminals and transmission ports are provided in one-to-one correspondence as described above, audio signals inputted from the input terminals are outputted from the corresponding transmission ports as pieces of waveform data after AD conversion or level adjustment is performed thereon according to need.

Subsequently, at the PC 10 side, the pieces of waveform data are received by reception ports corresponding to the transmission ports at the signal input device 30 side prepared by the WAVE drivers 12*c*.

Figure 5:
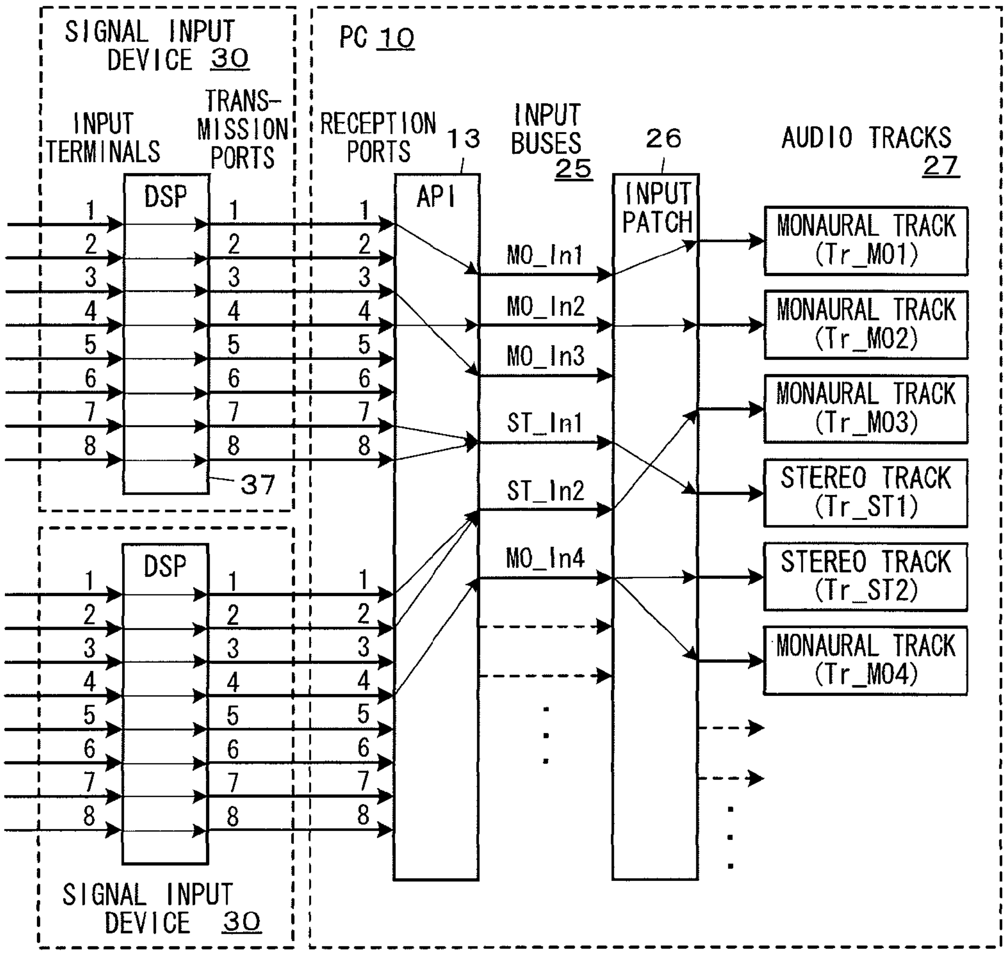
FIG. 5 is a diagram for explaining transmission paths of audio signals from when they are inputted from signal input terminals of the signal input device shown in FIG. 1 until when they are inputted into tracks of a DAW application used for recording.

As shown in FIG. 5, the PC 10 can receive pieces of waveform data from a plurality of signal input devices 30, and in this case, reception ports are prepared for every device being waveform data transmission source. Further, even when pieces of waveform data are received from a plurality of the same model of signal input devices 30, the WAVE drivers 12*c* can distinguish respective devices based on a connection order of a chain connection, an IP address, a MAC address or the like, and can recognize that each of the reception ports corresponds to which port of which device.

Input buses 25, an input patch 26 and audio tracks 27 shown in FIG. 5 are functions provided by the DAW application 20.

Among the above, the input buses 25 input pieces of waveform data received by specific reception ports designated by later-described project data. Arrows illustrated in a box of the API 13 in FIG. 5 indicate a correspondence between buses and reception ports being input sources.

Note that the input bus 25 includes two types of monaural bus (MO_Inx) and stereo bus (ST_Inx). The monaural bus inputs waveform data transmitted from one port of the signal input device 30 and received by one reception port of the PC 10 as monaural waveform data. Meanwhile, the stereo bus inputs pieces of waveform data transmitted from two ports of the signal input device 30 and received by two reception ports of the PC 10 as stereo waveform data of two channels.

Note that it is not necessary that a mode of a port at the signal input device 30 side and a type of the input bus 25 into which waveform data transmitted from the port is inputted coincide with each other. In other words, it is also possible that pieces of waveform data transmitted from two ports in a monaural mode are inputted into a stereo bus and waveform data transmitted from one of paired ports in a stereo mode is inputted into a monaural bus.

Further, it is possible to create an arbitrary number of input buses 25 automatically or in accordance with an instruction from a user as long as a capacity of hardware of the PC 10 allows. By setting, after the input bus 25 is created, that waveform data received by which reception port is inputted into the bus, it is possible to create a state where the waveform data is inputted into the bus. To perform such setting is referred to as "to connect" a bus and a reception port (further, a transmission port at the signal input device 30 side corresponding to the reception port).

Here, regarding a connection between a bus and a reception port, each reception port can be connected to only one bus, and each bus can be connected to only one (one for each of channels in a case of stereo bus) reception port. Accordingly, when a certain bus is connected to a certain reception port, a connection between the certain reception port and a bus to which the reception port was connected is cut off.

Note that a reception port which is not connected to any bus or a bus which is not connected to any reception port may exist. Further, these regulations are not mandatory as will be described later in a modified example.

The input patch 26 has a routing function which supplies waveform data inputted into a specific input bus to a specific audio track in accordance with contents of later-described project data. Arrows illustrated in a box of the input patch 26 in FIG. 5 indicate a correspondence between buses and reception ports being input sources.

When a user sets, with respect to each audio track 27, that waveform data from which input bus is inputted into the audio track, it is possible to create a state where the waveform data is supplied from the input bus to the audio track 27. To perform such setting is referred to as "to connect" a track and a bus.

Note that in this embodiment, regarding a connection between a track and a bus, it is possible to connect one bus to a plurality of tracks, but, it is not possible to connect one track to a plurality of buses. Further, a bus which is not connected to any track or a track which is not connected to any bus may also exist. Furthermore, a type (monaural/stereo) of bus and track does not always have to be considered at the time of connection. This point will be described later.

The audio track 27 is a track described in the explanation of the audio processing module 23 in FIG. 1, and has a function of at least recording waveform data inputted therein. Further, it is also possible to create an arbitrary number of audio tracks 27 automatically or in accordance with an instruction from a user as long as a capacity of hardware of the PC 10 allows.

Further, the audio track 27 also has two types of monaural track (Tr_Mox) and stereo track (Tr_STx). The monaural track inputs monaural waveform data of one channel to record the data, and the stereo track inputs stereo waveform data of two channels of L and R and records the data in each channel.

Basically, a monaural track is for recording waveform data inputted from a monaural bus and a stereo track is for recording waveform data inputted from a stereo bus, but, it is not limited to this. For example, when waveform data from a monaural bus is inputted into a stereo track, it is only required to input the same waveform data into both channels of L and R of the track. Further, when pieces of waveform data from a stereo bus are inputted into a monaural track, it is only required to select and input waveform data of either bus of L and R.

In the audio signal processing system 1, through a transmission path such as described above, it is possible to input audio signals inputted from respective input terminals of the signal input device 30 into the desired audio tracks 27 via the input buses 25 to record the signals. In this case, as will be understood by following the arrows in the drawing backwards, when one audio track is designated, a transmission port or an input terminal at the signal input device 30 side being a supply source of the waveform data inputted into the track can be specified.

Figure 6:
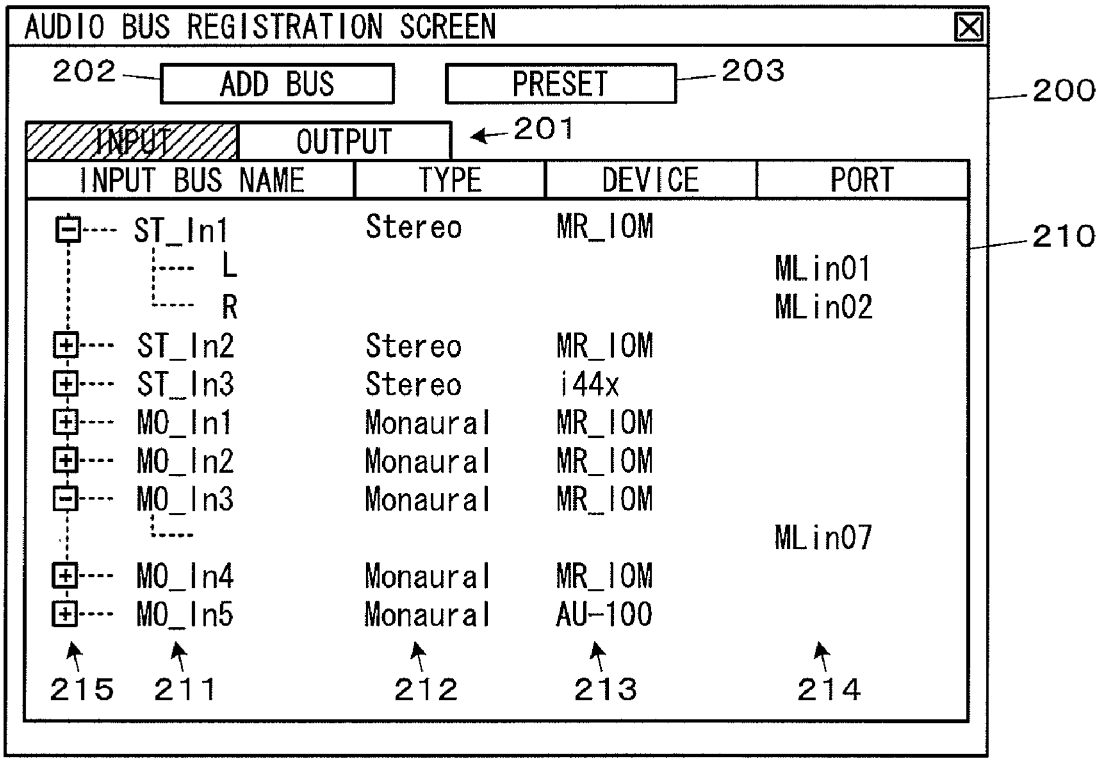
FIG. 6 is a diagram showing a display example of a screen for performing a setting regarding an input bus in the DAW application.

Next, FIG. 6 shows a display example of a screen for performing a setting regarding the aforementioned input bus 25.

An audio bus registration screen 200 shown in FIG. 6 is a GUI (graphical user interface) to be displayed on a display of the PC 10, and is a screen for giving an instruction regarding creation and elimination of the input bus 25 shown in FIG. 5, setting of connection of the input bus 25 to a reception port, and the like.

The audio bus registration screen 200 includes an input/output selection tab 201, a bus addition button 202, a preset read button 203 and a bus list display part 210.

Among the above, the input/output selection tab 201 is a button for selecting whether to display information on input buses shown in FIG. 5 or information on not-shown output buses in the bus list display part 210. In the drawing, a state where the input bus is selected is illustrated. Note that the output bus has no particular relation to the characteristic of this embodiment, so that detailed explanation thereof will be omitted.

The bus addition button 202 is a button for instructing an addition of buses. A bus which can be added by clicking this button is a bus of a type selected by the input/output selection tab 201 (input bus in an example in the drawing).

A setting of input buses to be set on this screen is stored in a preset memory by selecting "save" from a menu which is displayed when right-clicking on the screen. The preset read button 203 is a button for selecting a preset in the preset memory. When this button is clicked, presets in the preset memory are list-displayed, and by selecting a desired preset among them, the setting stored in the selected preset can be reflected to the setting of current input buses.

The bus list display part 210 is a display part showing, as a list form, information on buses of a type selected by the input/output selection tab 201 among buses currently existing in the DAW application 20. In the bus list display part 210, a bus name display portion 211, a bus type display portion 212, a connection device display portion 213 and a connection port display portion 214 are included.

Among the above, the bus name display portion 211 is a display portion for displaying a bus name. The name may be set automatically or by a user.

The bus type display portion 212 is a display portion for displaying a type (monaural/stereo) of bus. The type is decided when the bus is created, and cannot be changed thereafter.

The connection device display portion 213 is a display portion for displaying a name of device (signal input device 30 or the like) which supplies waveform data inputted into a bus. The information cannot be changed independently, and when a port of connection destination is designated, the information is automatically set according thereto. Further, the name of device is not necessarily to be the one by which an individual can be identified, and may be a name of a model or a manufacturer, or information indicating a position of device such as an address.

The connection port display portion 214 is a display portion for displaying an ID of reception port connected to a bus. Note that the port ID is displayed by being corresponded, not to the entire bus, but to respective channels in the bus. The bus list display part 210 includes deployment buttons 215 on the left side of the screen corresponding to respective buses, in which when the button is in a state of "+", only information on the entire bus is displayed, and by clicking the button to turn it into "−", information regarding respective channels in the bus can be displayed. In a monaural bus, there is only one channel for one bus, but, in a stereo bus, there are two channels of L and R, as shown in a field of ST_In1.

Further, by right-clicking on a display of a connection destination port corresponding to each channel in the connection port display portion 214, it is possible to display a list of reception ports capable of being connected to the bus and to select a port from the list to set it as a connection destination. According to the setting, the name of device displayed on the connection device display portion 213 is automatically set.

Note that the respective port IDs and the names of devices are automatically decided based on the functions of the WAVE drivers 12*c*, and how to name them depends on the functions of the drivers. Regarding the port ID, a number may simply be designated, or an ID including a name of connection destination device may be designated after the name is confirmed. In either case, it is conceivable that an ID by which a correspondence between a port and a terminal at the signal input device 30 side can be grasped to some extent is normally designated.

Figure 7:
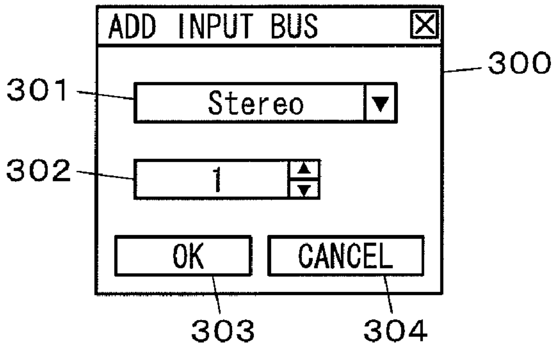
FIG. 7 is a diagram similarly showing a display example of a screen for instructing an addition of input bus.

Next, a display example of a screen for instructing an addition of input bus is shown in FIG. 7.

An input bus addition screen 300 shown in FIG. 7 is also a GUI to be displayed on the display of the PC 10, and is a screen for instructing an addition of the input bus 25.

This screen is displayed when the bus addition button 202 is clicked on the audio bus registration screen 200 under the state where the input bus is selected by the input/output selection tab 201. The input bus addition screen 300 includes a bus type designation portion 301, a bus number designation portion 302, an OK button 303 and a cancel button 304.

Among the above, the bus type designation portion 301 and the bus number designation portion 302 are respectively portions for accepting designations regarding the type and the number of buses to be added. Further, by clicking the OK button 303 after these designations are made, it is possible to add the bus with the type and the number according to the designated contents.

However, since a port of a connection destination is not set at this moment, in order to input waveform data into the created bus, there is a need to set the connection destination on the audio bus registration screen 200.

When the cancel button 304 is clicked, the input bus addition screen 300 is closed without conducting the addition of buses to return to the audio bus registration screen 200.

Figure 8:
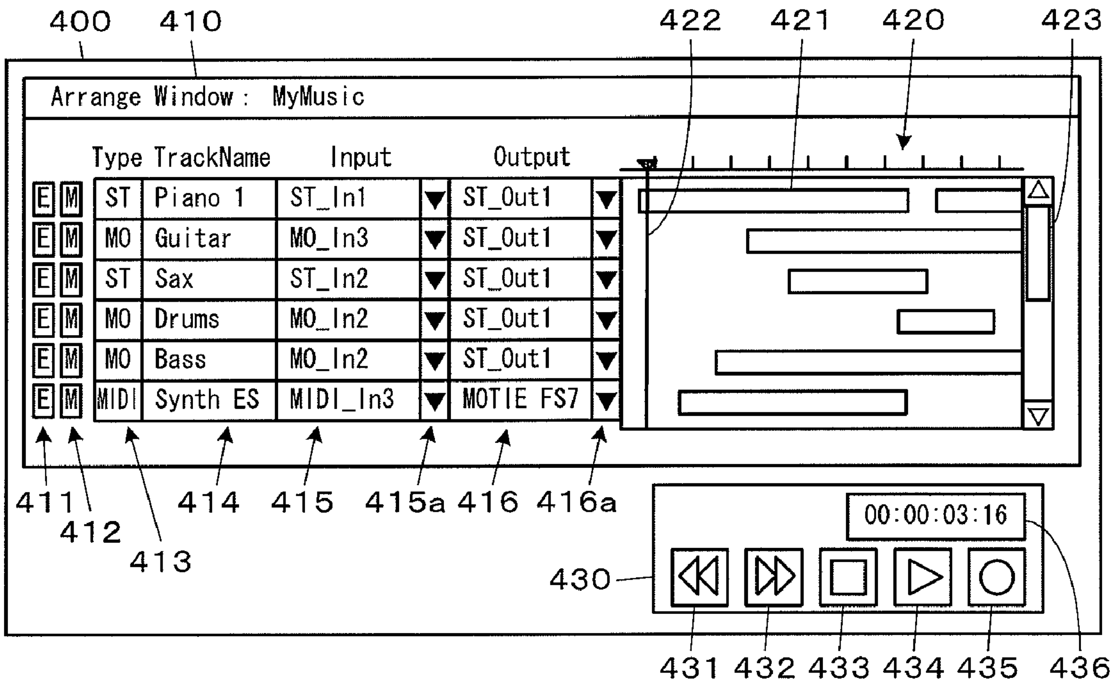
FIG. 8 is a diagram similarly showing a display example of a screen for performing a setting regarding a track.

Next, FIG. 8 shows a display example of a screen for conducting a setting regarding the aforementioned tracks.

A track control screen 400 shown in FIG. 8 is also a GUI to be displayed on the display of the PC 10, and is a screen for conducting a setting regarding the aforementioned tracks. The track control screen 400 includes a track setting window 410 and a recording and reproducing window 430.

The track setting window 410 is a screen provided for performing setting related not only to the audio tracks 27 shown in FIG. 5 but also to the MIDI tracks provided in the MIDI processing module 22 for handling MIDI data. The track setting window 410 includes a one-line length setting and displaying field for each created track in order to accept settings regarding the corresponding tracks and display the information.

In each line of the track setting window 410, a recording standby button 411, a mute button 412, a type display portion 413, a name set portion 414, an input source bus set portion 415 and an output destination bus set portion 416 are provided.

The recording standby button 411 is a button for switching by toggling between a recording standby state and a released state of each track. The mute button 412 is a button for switching by toggling between mute on and off of each track.

When it is instructed to start recording (when a recording button 435 is turned on and then a start button 434 is turned on), the recording of tracks in a recording standby state at that moment is started. The waveform data inputted into the tracks is recorded while reproduction of the tracks, which are not in a muted state (reproduction off) among other tracks, is started to read and output waveform data recorded in the tracks. On the other hand, when it is instructed to start reproducing (when the recording button 435 is turned off and then the start button 434 is turned on), the reproduction of the tracks which are not in a muted state at that moment is started and the waveform data recorded in the tracks is read to be outputted.

The type display portion 413 is a display portion for displaying whether the type of the track is a monaural track (MO) or a stereo track (ST) of an audio track, or a MIDI track (MIDI).

The name set portion 414 is a region for inputting and setting names of tracks.

The input source bus set portion 415 is a region for setting an input bus to be connected to each track via the input patch 26. By clicking a pull-down button 415*a*, it is possible to display a list of currently existing input buses and to select and set a bus of connection destination among them. Note that an audio track can be connected only to an audio bus, and a MIDI track can be connected only to a MIDI bus.

The output destination bus set portion 416 is a region for setting an output destination of waveform data from each track. Although an illustration is omitted in FIG. 5, waveform data inputted into each audio track or waveform data reproduced in each audio track can be transmitted to the signal input device 30 and outputted from an output terminal via an output bus and an output port along the path similar to that at the time of input shown in FIG. 5 but in nearly opposite direction. The output bus to be an output destination of the waveform data can be set in the output destination bus set portion 416.

This setting can be realized by clicking a pull-down button 416*a* to display a list of currently formed output buses and selecting a bus of connection destination among them. At this time, it is also possible to set output destinations of a plurality of tracks to the same bus, and in this case, pieces of waveform data from the plurality of tracks are mixed in the bus and then supplied to the next stage. Note that also regarding the output, an audio track can be connected only to an audio bus and a MIDI track can be connected only to a MIDI bus.

An example shown in FIG. 8 illustrates a state where input buses ST_In1, MO_In3, ST_In2, MO_In2 and MO_In2 being input sources (fourth and fifth input buses are the same input source) and an output bus ST_Out1 being an output destination are set for five audio tracks from the top.

Detailed explanation regarding an MIDI track will be omitted here.

The track setting window 410 also has a track content indicator 420.

The track content indicator 420 is a portion indicating a data storage condition and a recording and reproducing status in each track. The abscissa axis represents time. Bars 421 represent time periods of recorded data. A cursor 422 indicates a position to start recording or reproducing or an executing position. Further, a slider 423 and scroll buttons above and under the slider 423 are used to scroll the screen and change tracks to be displayed on the track setting window 410.

The recording and reproducing window 430 is a window for accepting an operation to start and stop recording or reproducing. A fast-rewind button 431 and a fast-forward button 432 are respectively used to start fast-rewinding and fast-forwarding. A stop button 433 is used to stop reproducing, recording, fast-rewinding and fast-forwarding. The start button 434 is used to start reproducing and recording. The recording button 435 is used to switch, by toggling, the function of pressing the start button 434 between start of reproducing and start of recording. A recording and reproducing position indicator 436 is a portion for showing the position indicated by the cursor 422 as time from the beginning of the track.

Figure 9:
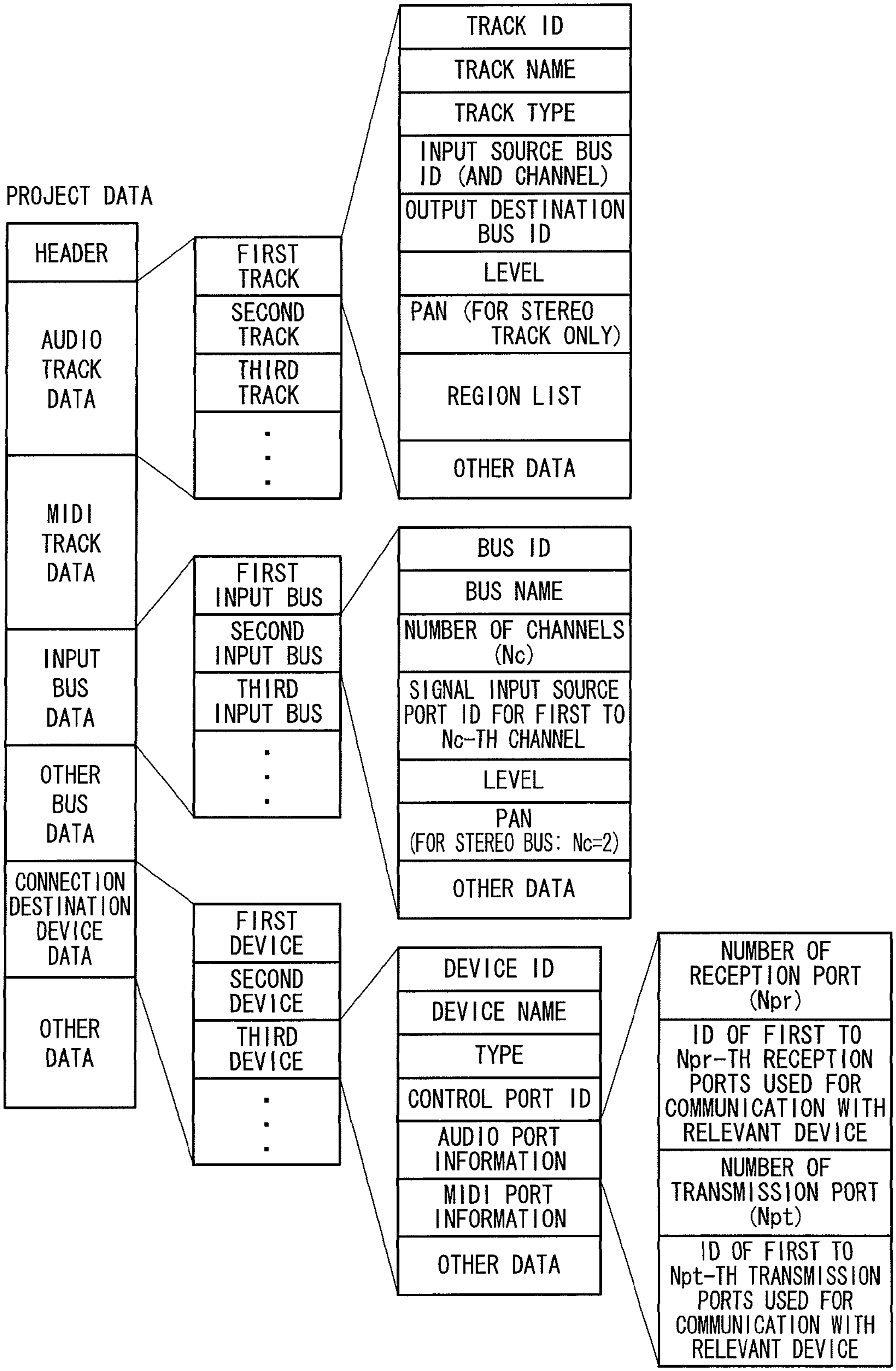
FIG. 9 is a diagram showing a configuration example of project data.

Next, a configuration example of project data is shown in FIG. 9.

The project data is used for managing an audio track and an MIDI track, and indicates set contents of transmission paths of data in the DAW application 20 and information on respective devices which communicate with the DAW application 20. It is possible to store project data at a specific moment, as a project file, to the HDD 64 of the PC 10, a detachable recording medium such as a USB memory or a memory card, a recording medium of an external device capable of communicating with the PC 10, or the like. In addition, it is also possible to reflect set contents at the time of storing the data on an operation of the DAW application 20 by reading the project data from the project file in accordance with an instruction from a user.

The project data concretely includes a header, audio track data, MIDI track data, input bus data, other bus data, connection destination device data and other data. Among the above, the audio track data, the input bus data and the connection destination device data relate to the characteristic of this embodiment, so that further detailed explanation thereof will be given.

The audio track data is data specifying a name, a connection destination, signal processing contents and the like of each audio track existing (used) in the DAW application 20.

More concretely, the audio track data includes, for each audio track, a track ID, a track name, a track type, an input source bus ID (and channel), an output destination bus ID, a level, a pan, a region list and other data.

Among the above, the track ID, the track name and the track type are data indicating an ID of the track, data indicating a name of the track and data indicating whether the track is stereo or monaural, respectively.

The input source bus ID and the output destination bus ID are respectively an ID of an input bus from which waveform data is inputted into the relevant track and an ID of an output bus to which the waveform data is outputted from the relevant track. These IDs are specified by using later-described bus IDs. Further, when a stereo input bus is connected to a monaural track, not only the input source bus ID but also a signal of either L or R channel to be inputted into the track is specified.

The level and the pan are parameters indicating contents of level adjustment and panning (only when the track is a stereo track) performed on output data when the waveform data is outputted from the track.

The region list specifies information on a reproduction start time of each region on the time axis of the track, a waveform file name, a reproduction range in the file and the like, as information on each time domain (region) during which waveform data is recorded in the relevant track.

When the recording is performed on an audio track, one waveform file is newly formed in the HDD 64. Audio signals inputted into the track are recorded in the waveform file, and pieces of data regarding a reproduction start time, a name of the waveform file, a reproduction range indicating a range of waveform in the file to be reproduced, and the like, are added in the region list. Through the processes, the audio signals recorded in the waveform file are additionally arranged on the time axis of the track.

When reproducing the audio track, the data regarding the reproduction start time, the waveform file name, the reproduction range and the like of each region are sequentially read from the region list of the track in an order of early reproduction start time, and at a timing indicated by the reproduction start time, waveform in a range indicated by the reproduction range in the waveform file indicated by the waveform file name is read to be reproduced.

The input bus data is data specifying a name, a connection destination, signal processing contents and the like of each input bus for transferring waveform data existing (used) in the DAW application 20.

More concretely, the input bus data includes, for each input bus, a bus ID, a bus name, the number of channels, a signal input source port ID, a level, a pan and the other data.

Among the above, the bus ID and the bus name are data indicating an ID and a name of the bus, respectively.

The number of channels indicates the number of channels (referred to as Nc) of waveform data transferred by the relevant bus, and is data substantially indicating a type of the bus. Specifically, when the number of channels is 1, the bus is a monaural bus and when the number of channels is 2, the bus is a stereo bus. Here, the Nc is 1 or 2, but, it is of course conceivable to form buses with Nc of 3 or more.

The signal input source port ID is an ID of reception port to be an input source of waveform data to the relevant bus. When the relevant bus transfers waveform data of a plurality of channels, an ID of the input source port is individually specified for each channel. Note that if the connection destination device data is searched using the port ID as a key, it is possible to confirm that the port relating to the ID is used for communication with which device.

The level and the pan are parameters indicating contents of level adjustment and panning (only when the bus is a stereo bus) performed on output data when the waveform data is outputted from the bus.

The connection destination device data is data specifying, for each device communicating with the PC 10 and inputting and/or outputting data into and/or from the DAW application 20, a name, a port used to communicate with the device, and the like.

More concretely, the connection destination device data includes, for each device, a device ID, a device name, a type, a control port ID, audio port information, MIDI port information, and other data.

Among the above, the device ID, the device name and the type respectively indicate an ID, a name and a type of the relevant device. Further, the device ID is an ID by which the DAW application 20 can uniquely specify each device. The name is a name to be displayed on the connection device display portion 213 on the screen shown in FIG. 6. The type is data indicating a model of the device.

The control port ID is an ID of a port used for transmitting/receiving control data to/from the relevant device.

The audio port information is information on a port used for transmitting/receiving waveform data to/from the relevant device. More concretely, the audio port information includes the number Npr of ports used for receiving the waveform data, the number Npt of ports used for transmitting the waveform data and port IDs of the respective ports. If only either the transmission or reception is performed, Npr or Npt may become zero.

The MIDI port information is information on a port used for transmitting/receiving MIDI data (except the one to be transmitted/received as control data) to/from the relevant device. The form thereof is the same as that of the audio port information.

Among the above information, the respective port IDs are IDs allocated by an OS to the communication ports when the ports are created by the various I/O drivers 12. The OS does not allocate the same ID to a different port.

A device connected to the audio LAN 50 as a connection destination device includes a model capable of automatically setting contents of the connection destination device data shown in FIG. 9 through a communication between the DAW application 20 and the connection destination device itself (automatic setting type) and a model which cannot perform the automatic setting (manual setting type).

Regarding the device of the automatic setting type, the DAW application 20 performs, when it is activated or the connection destination device is connected, a communication with the connection destination device via a control port to obtain the device ID, the device name, the type, Npr and Npt respectively being the number of reception ports and transmission ports for audio and MIDI reception ports, and registers them as one piece of device data of the connection destination device data shown in FIG. 9.

Further, the DAW application 20 obtains, from the connection destination device, information indicating each transmission port and reception port included in the connection destination device are connected to which virtual communication path on the audio LAN 50, discriminates, based on the information, the transmission port and the reception port are connected to which reception port and transmission port of the various I/O drivers 12, and registers information indicating the discriminated ports.

Regarding the model of manual setting type, data of the corresponding device is manually registered by a user. Note that in this example, it is assumed that data of all devices connected to the audio LAN 50 is correctly registered.

Note that although the connection destination device data reflects a connection state of the device at the time of storing the project data, there is no assurance that the connection state matches an actual connection state of the device when reading the project data. Accordingly, when reading the project data, the DAW application 20 does not reflect the connection destination device data itself on its operation, and compares the connection destination device data held by the driver or the OS with contents of the read project data. Further, the DAW application 20 reflects the signal input source port ID among the input bus data on its operation only to the extent in which the connection destination device data stored as the project data matches the data held by the driver or the OS when reading the project data, and regarding items in which they do not match, the DAW application 20 considers that no input source port for the bus exists, namely, a connection between the bus and the reception port is cut off.

Next, processing related to the characteristic of this embodiment to be executed by the CPU 61 of the PC 10 and the CPU 31 of the signal input device 30 will be explained. Among the processing to be described below, all the parts executed by the CPU 61 of the PC 10 are executed as a part of the function of the DAW application 20 by executing a program of the DAW application. In that context, processing at the PC 10 side is described as "DAW side processing" in the following drawings.

Figure 10:
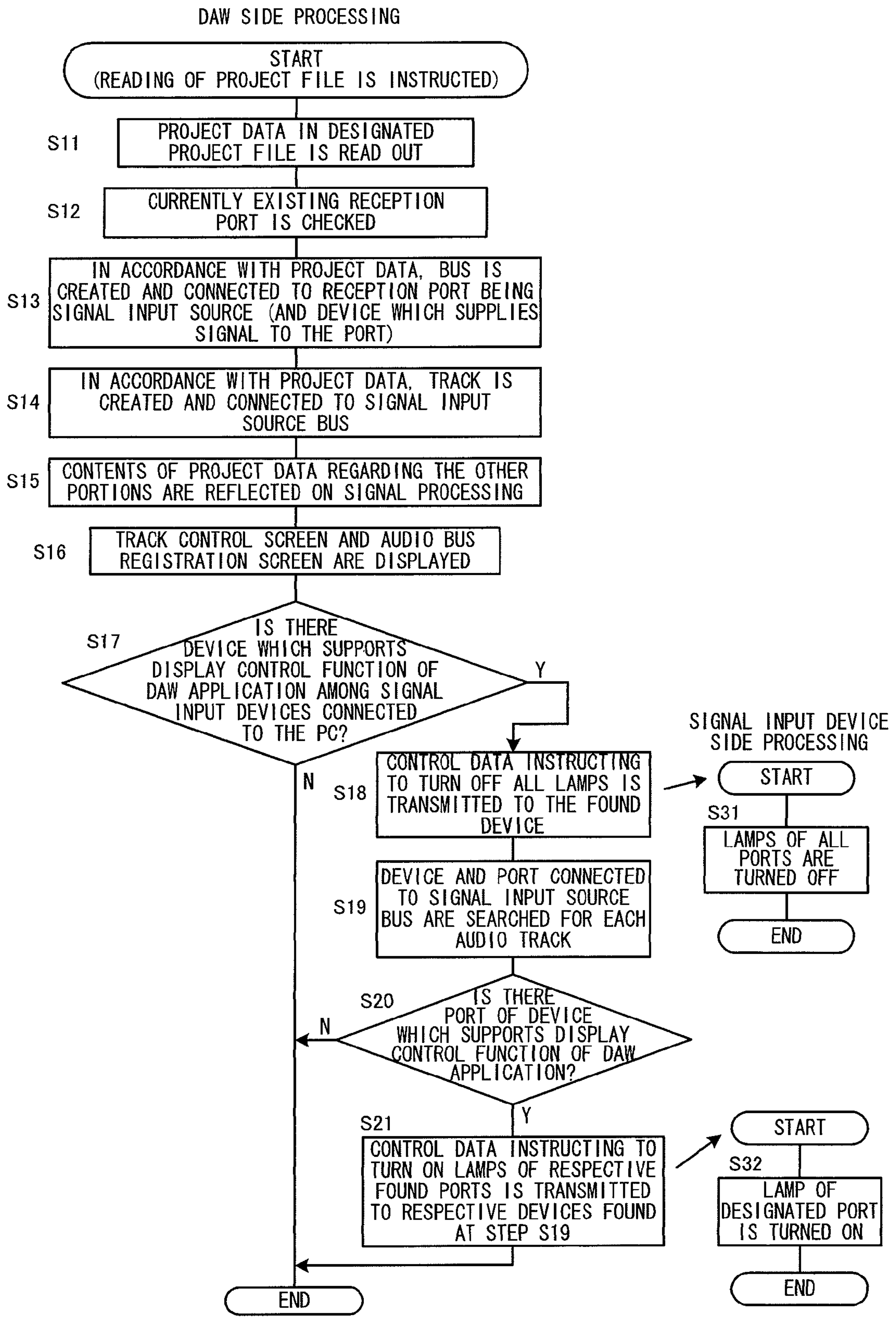
FIG. 10 is a flowchart of processing executed by CPUs of the PC and the signal input device when read out of a project file is instructed.

FIG. 10 shows a flowchart of processing when a reading instruction of the project file is issued.

When the reading of the project file is instructed, the CPU 61 of the PC 10 starts the processing in the flowchart at the left side of FIG. 10.

First, the CPU 61 reads out the project data in the project file designated to be read (S11), and makes inquiries to the driver or the OS to check reception ports which currently exist (S12).

Thereafter, in accordance with the project data read out in step S11, the CPU 61 creates input buses specified in the input bus data and connects each of the created buses to a reception port being a signal input source (S13). At this time, the input bus is required to be connected only to a port which currently exists among the ports specified by the signal input source port IDs in the project data, as described above. Further, by connecting the bus to the reception port, the bus is also connected indirectly to a device which supplies a signal to the port.

Next, in accordance with the project data read in step S11, the CPU 61 creates tracks specified in the audio track data, and connects each of the created tracks to a signal input source bus (S14).

By the processing so far, it is possible to form a logical transmission path for supplying waveform data inputted into the PC 10 from an external device such as the signal input device 30 to an audio track in which the waveform data is recorded. Note that when reading the project data, all the buses and tracks which exist at that time are deleted, and buses and tracks created in accordance with the data in the project file exist thereafter.

Then, the CPU 61 also reflects the contents of project data regarding the other portions on the signal processing in the DAW application 20 (S15). Although detailed explanation is omitted, this processing includes a connection between a track and an output port, a formation of MIDI data transmission path and the like.

Further, in the processing up to step S15, the CPU 61 serves as a reflecting device.

Next, the CPU 61 displays the track control screen 400 shown in FIG. 8 and the audio bus registration screen 200 shown in FIG. 6 on the display based on the set contents set by the processing so far (S16).

After that, the CPU 61 discriminates whether or not there exists a device which supports a display control function of the DAW application 20 among signal input devices connected to the PC 10 (S17). This determination can be made by comparing model information on the connection destination device with a previously stored list of model supporting the display control function, or by making inquiries to the connection destination device. Further, the display control function described here is a function of controlling display contents of an indicator (lamp 35 in this case) corresponding to a port included in the destination device. This point applies to the description hereinbelow as well except when especially noted.

Note that a certain device supports the display control function concretely means that the device can interpret control data for controlling display contents of the indicator transmitted from the DAW application 20 and can execute processing according thereto. If a protocol of the control data differs by each model, the DAW application 20 is only required to transmit control data according to the protocol corresponding to the device.

If it is YES in step S17, namely, when a device supporting the display control function of the DAW application 20 is found, the CPU 61 transmits control data instructing to turn off all the lamps to the found device (S18).

When the signal input device 30 supporting the display control function receives the control data, the CPU 31 starts the processing in the flowchart at the right side of FIG. 10, and turns off the lamps 35 of all the ports (S31). Arrows in the drawing indicate that a device starts top side processing upon receiving data transmitted in bottom side step. This applies to the drawings hereinbelow as well.

After step S18 is conducted, the CPU 61 searches, for each of the currently existing audio tracks, a device and a port connected to the signal input source bus (S19). In this processing, based on the input bus data, the connection destination device data shown in FIG. 9 and a setting of input source for each audio track, a signal input device and its transmission port being supply sources of waveform data inputted into each audio track are specified by following the arrow indicating the signal transmission path shown in FIG. 5 from each of the audio tracks in the opposite direction.

Subsequently, when the CPU 61 finds ports of devices supporting the display control function of the DAW application 20 in step S19 (YES in S20), the CPU 61 transmits control data (second control data) instructing to turn on lamps of the respective found ports to the respective found devices (S21), and terminates the processing.

When the signal input device 30 supporting the display control function receives the control data, the CPU 31 turns on the lamp 35 of the designated port (S32).

If it is NO in step S17 or it is NO in step S20, the CPU 61 cannot control the display in the connection destination device even if the control data is transmitted, and thus there is no point in conducting the processing, so that the processing is terminated.

In the aforementioned processing, the CPU 61 serves as a second searching device in step S19, and it serves as a second control data transmitter in steps S20 and S21. Further, in steps S31 and S32, the CPU 31 serves as a display controller.

By executing the aforementioned processing, when the DAW application 20 reads the project file and changes configurations of tracks and buses in accordance with the data of the file, it is possible to make an indicator corresponding to a port being a supply source to supply waveform data to at least one track, of each of signal input devices (among them, a device supporting the display control function) connected to the PC 10, perform a display indicating that the waveform data outputted from the port is supplied to at least the one track (to turn on a lamp, in this case).

Therefore, a user can easily recognize a connection state between a track and a signal input device such as that a cable is to be connected to which terminal when waveform data is recorded in a track or whether a desired port is connected to the track, regardless of a configuration of a signal transmission path therebetween.

Figure 11:
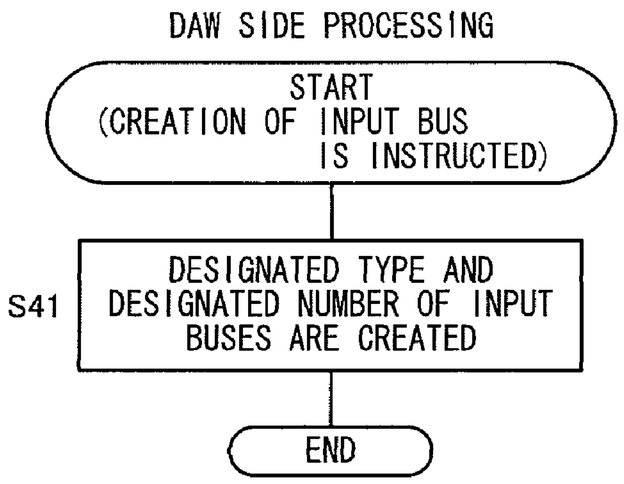
FIG. 11 is a flowchart of processing executed by the CPU of the PC when creation of an input bus is instructed.

Next, FIG. 11 shows a flowchart of processing when creation of an input bus is instructed.

When the instruction to add the input bus is made on the input bus addition screen 300 shown in FIG. 7, the CPU 61 of the PC 10 starts the processing in the flowchart of FIG. 11. In this processing, the CPU 61 creates the designated type and the designated number of input buses (S41), and terminates the processing. Here, it is not particularly required to connect a bus and a reception port.

Figure 12:
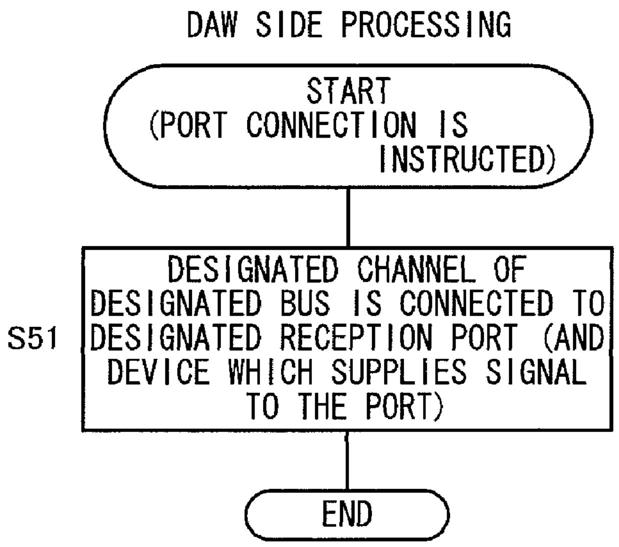
FIG. 12 is a flowchart of processing executed by the CPU of the PC when connection of a reception port to an input bus is instructed.

Next, FIG. 12 shows a flowchart of processing when connection of a reception port to an input bus is instructed.

When the instruction to connect the reception port to the input bus is made on the audio bus registration screen 200 shown in FIG. 6, the CPU 61 of the PC 10 starts the processing in the flowchart of FIG. 12. In this processing, the CPU 61 connects the designated channel of the designated input bus to the designated reception port (S51), and terminates the processing. Through this processing, the designated input bus is also connected indirectly to a device which supplies a signal to the reception port of the connection destination.

Figure 13:
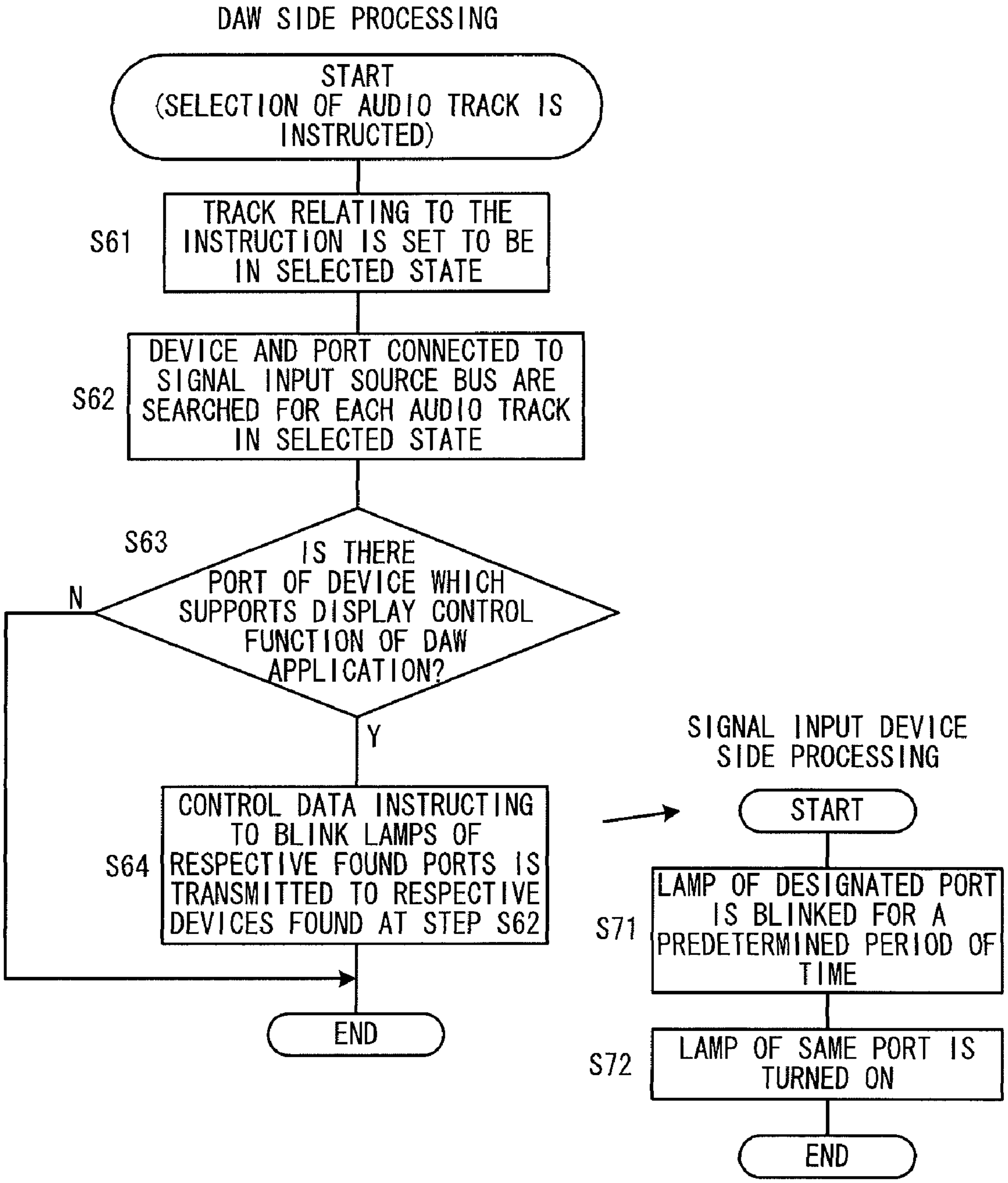
FIG. 13 is a flowchart of processing executed by the CPUs of the PC and the signal input device when selection of an audio track is instructed.

Next, FIG. 13 shows a flowchart of processing when selection of an audio track is instructed.

When the instruction to select the audio track is made on the track control screen 400 shown in FIG. 8, the CPU 61 of the PC 10 starts the processing in the flowchart at the left side of FIG. 13. Note that regarding the selection of tracks, only one track can be selected by clicking on a display of track or a plurality of tracks can be simultaneously selected by specifying a range.

In this processing, the CPU 61 first sets a track relating to the selection in a selected state (S61). Subsequently, the CPU 61 searches, for each audio track in the selective state, a device and a port connected to a signal input source bus based on the input bus data and the connection destination device data shown in FIG. 9 (S62). The search is performed in the same manner as in step S19 in FIG. 10.

Subsequently, when the CPU 61 finds ports of devices supporting the display control function of the DAW application 20 (YES in S63), the CPU 61 transmits control data (first control data) instructing to blink lamps of the respective found ports to the respective found devices (S64), and terminates the processing.

When the signal input device 30 supporting the display control function receives the control data, the CPU 31 starts the processing in the flowchart at the right side of FIG. 13, and after blinking the lamp 35 of the designated port for a predetermined period of time, the CPU 31 turns on the lamp of the same port (S71 and S72).

If it is NO in step S63, the CPU 61 cannot control the display in the connection destination device, so that the processing is terminated directly.

In the aforementioned processing, the CPU 61 serves as a selecting device and a searching device in steps S61 and S62, respectively, and it serves as a control data transmitter in steps S63 and S64. Further, the CPU 31 serves as a display controller in steps S71 and S72.

By executing the aforementioned processing, it is possible to make an indicator corresponding to a port being a supply source to supply waveform data to at least one track among the selected audio tracks perform a display indicating that the port corresponds to the track (to blink a lamp, in this case). Note that such an indicator of the port is already turned on through the processing in FIG. 10, so that the display at the lamp is changed in an order of the light-on state, the light-blinking state and the light-on state by the processing in FIG. 13.

Further, a user can easily recognize, by the aforementioned display, a connection state between a desired track and a signal input device, regardless of a configuration of a signal transmission path therebetween.

Figure 14:
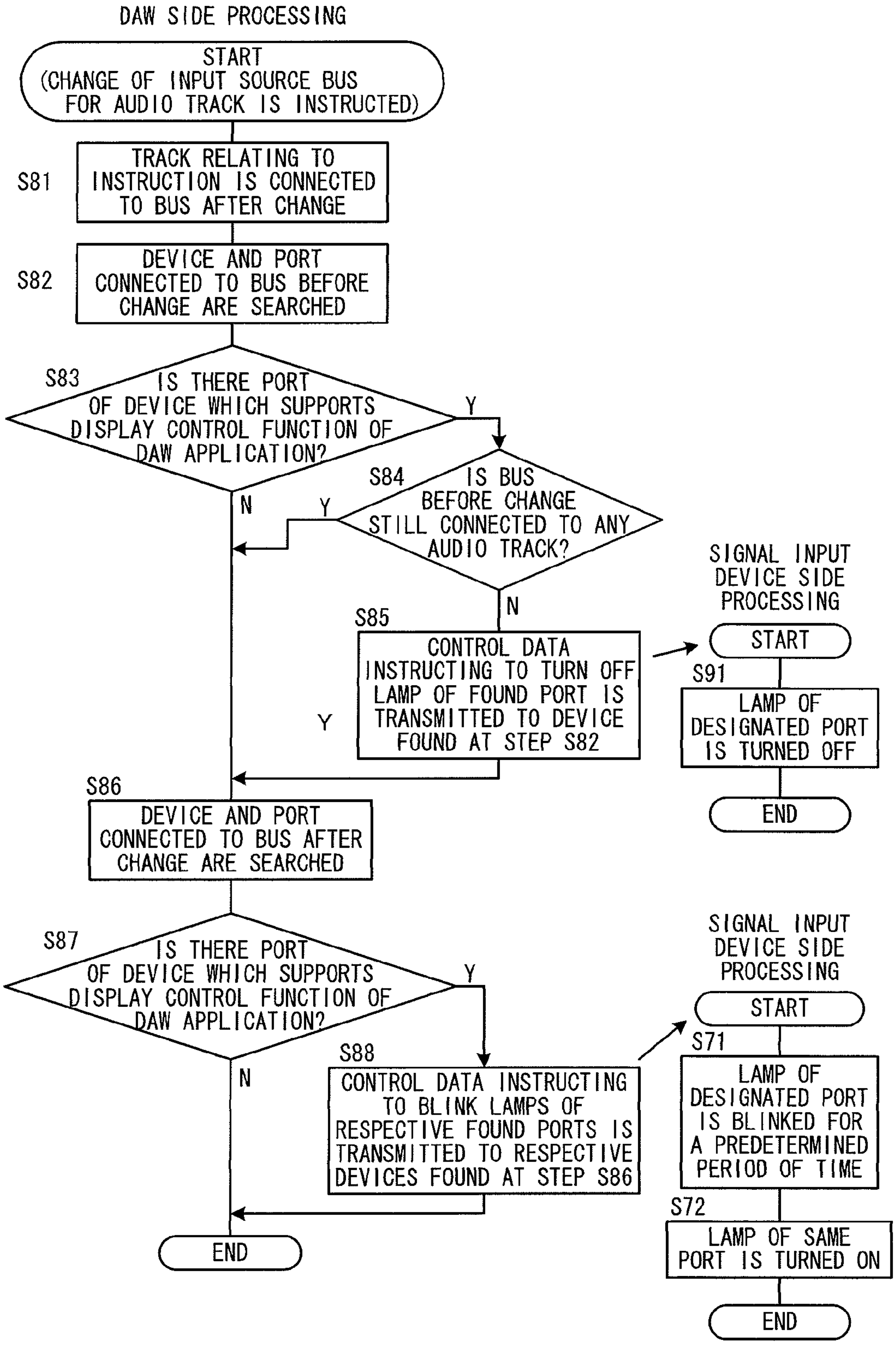
FIG. 14 is a flowchart of processing executed by the CPUs of the PC and the signal input device when change of an input source bus for an audio track is instructed.

Next, FIG. 14 shows a flowchart of processing when change of an input source bus for an audio track is instructed.

When the instruction to change the input source bus for the audio track is made on the track control screen 400 shown in FIG. 8, the CPU 61 of the PC 10 starts the processing in the flowchart at the left side of FIG. 14.

In the processing, the CPU 61 first connects a track relating to the instruction to the bus after the change (S81). Subsequently, the CPU 61 searches a device and a port connected to the input source bus before the change (S82). The search is performed in the same manner as in step S19 in FIG. 10.

Subsequently, when the CPU 61 finds a port of device supporting the display control function of the DAW application 20 (YES in S83) and if the original bus is no longer connected to any audio tracks (NO in S84), the CPU 61 transmits control data (third control data) instructing to turn off a lamp of the found port to the found device (S85).

When the signal input device 30 supporting the display control function receives the control data, the CPU 31 starts the processing in the flowchart at the right side of FIG. 14, and turns off the lamp 35 of the designated port (S91).

If it is YES in step S84, since the display indicating that the waveform data from the relevant port is still supplied to at least one track is kept displayed, the processing of step S85 is not conducted. If it is NO in step S83, it is not possible to control the display in the connection destination device, so that also in this case, the processing of step S85 is not conducted.

In either case, the CPU 61 next searches a device and a port connected to the input source bus after the change (S86). The search is also performed in the same manner as in step S19 in FIG. 10.

Subsequently, when the CPU 61 finds a port of device supporting the display control function of the DAW application 20 (YES in S87), it transmits control data (fourth control data) instructing to blink a lamp of the found port to the found device (S88), and terminates the processing.

Although processing at the signal input device 30 side at the time of receiving the control data is performed in the same manner as in the case of FIG. 13, a time period during which the lamp blinks or a style of how to blink the lamp may be changed.

If it is NO in step S87, it is not possible to control the display in the connection destination device, so that the processing is terminated.

In the aforementioned processing, the CPU 61 serves as a changing device in step S81, and it serves as a third control data transmitter in steps S82 to S88. Further, the CPU 31 serves as a display controller in steps S71, S72 and S91.

By executing the aforementioned processing, it is possible to make an indicator corresponding to a port which is made to be no longer a supply source to supply waveform data to any audio tracks at the time of changing the connection destination perform a display indicating that the waveform data outputted from the port is no longer supplied to any audio tracks (to turn off a lamp, in this case).

Further, it is also possible to make an indicator corresponding to a port newly made to be a supply source to supply waveform data to an audio track relating to the instruction at the time of changing the connection destination perform a display indicating that the waveform data outputted from the port is newly supplied to the audio track (to blink a lamp, in this case). Note that if this port was not a supply source to supply waveform data to any audio tracks before the connection destination was changed, the display at the lamp is changed in an order of the light-off state, the light-blinking state and the light-on state. Further, if this port was a supply source to supply waveform data to some audio track before the connection destination was changed, the display at the lamp is changed in an order of the light-on state, the light-blinking state and the light-on state.

Further, a user can easily recognize, by the aforementioned display, a connection state between a track and a signal input device in which a connection destination is changed, regardless of a configuration of a signal transmission path therebetween.

Note that also at the time of connecting a bus and a reception port through the processing in FIG. 12, if there exists a port which newly becomes a supply source to supply waveform data to some audio track or a port which becomes no longer a supply source to supply waveform data to any audio tracks because of this connection, it is possible to make a lamp display these pieces of information through processing similar to the aforementioned one in FIG. 14.

Figure 15:
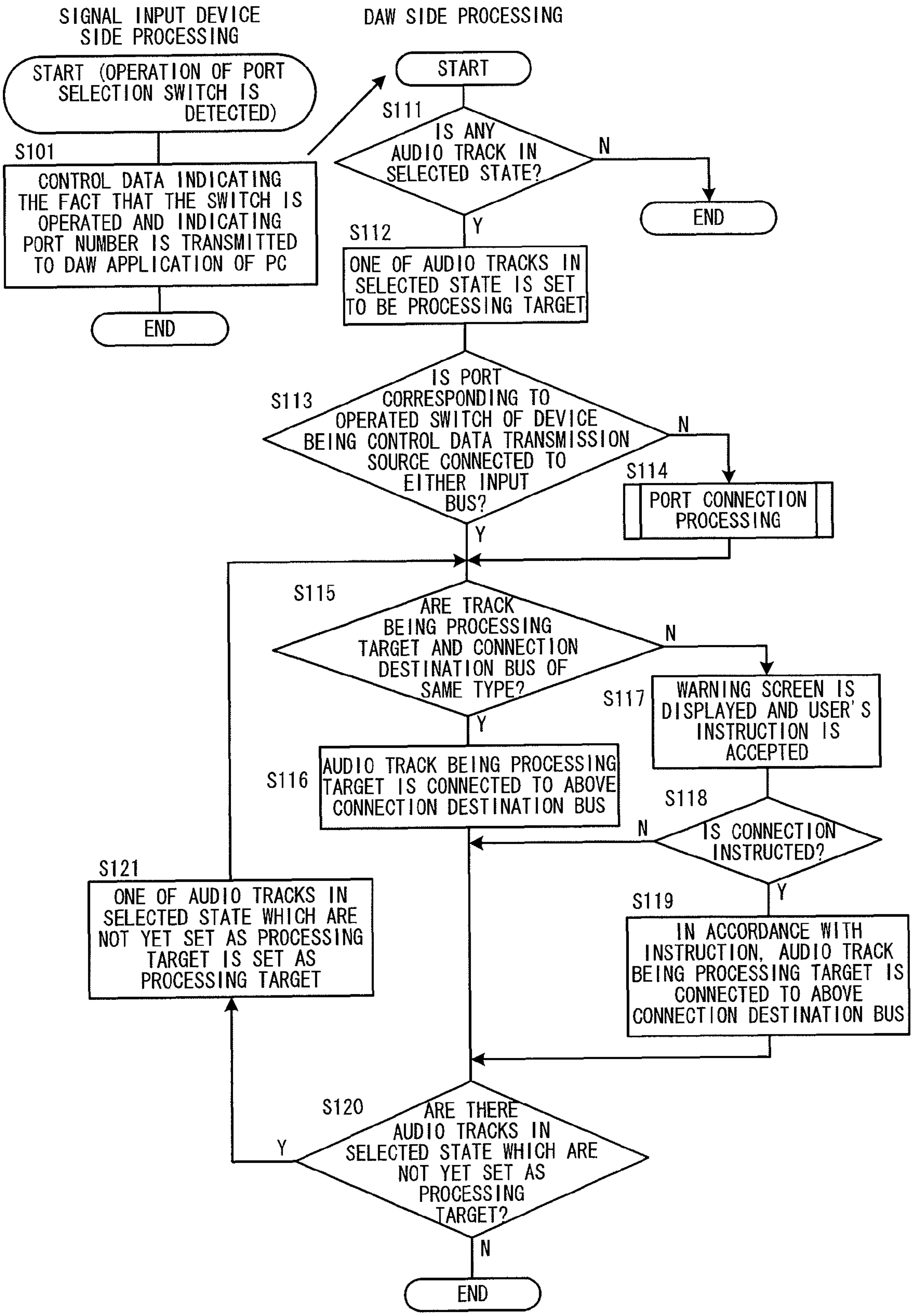
FIG. 15 is a flowchart of processing executed by the CPUs of the PC and the signal input device when a port selection switch is operated in the signal input device.

Next, FIG. 15 shows a flowchart of processing when a port selection switch is operated in a signal input device.

Upon detecting the operation of the port selection switch 34, the CPU 31 of the signal input device 30 starts the processing in the flowchart at the left side of FIG. 15. In this processing, the CPU 31 transfers control data indicating the fact that the switch is operated and a port number corresponding to the operated switch to the DAW application 20 of the PC 10 (S101).

The control data complies with a protocol specified by a simple setting function being a setting function of a signal transmission path in the DAW application 20 to be described with reference to this flowchart. Further, if the device can transmit the control data, it indicates that the device supports the simple setting function of the DAW application 20.

Upon receiving the control data, the CPU 61 of the PC 10 starts the processing in the flowchart at the right side of FIG. 15.

In this processing, a setting of signal transmission path through which waveform data outputted from a port corresponding to the operated port selection switch 34 is supplied to an audio track being in the selected state (refer to step S61 in FIG. 13) is performed. Accordingly, the CPU 61 first discriminates whether or not any audio track is in the selected state (S111), and if there is no track in the selected state, the processing is terminated.

Meanwhile, if there are tracks in the selected state, the CPU 61 first sets one of the tracks as a processing target (S112). A selection criterion for the processing target is that it has the smallest ID, or the like, and an arbitrary criterion can be applied. However, since the first processing target is referred to in port selection processing in step S114, it is preferably highly recognizable to a user.

Thereafter, the CPU 61 discriminates, based on the input bus data and the connection destination device data in FIG. 9, whether or not the port corresponding to the operated switch of a device being a control data transmission source is connected to any input bus of the DAW application 20 via a reception port of the PC 10 (S113). If there is no connection, port connection processing shown in FIG. 16 is conducted in order to firstly connect the port and the bus (S114).

In the port connection processing, the CPU 61 first decides a bus ID of a new bus to add the bus data to the input bus data in FIG. 9 and sets the number of channels Nc corresponding to a type of an audio track being the processing target, to thereby newly create an input bus of a type being the same type (monaural/stereo) as the audio track being the processing target (S131). Here, the type of the created bus is matched to that of the audio track being the processing target on the ground that the created bus is for supplying waveform data to the track being the processing target.

Thereafter, when the created bus is a monaural bus (S132), the CPU 61 instructs the device being the control data transmission source to set the port corresponding to the operated switch to be in a monaural mode in accordance with the type of the bus (S133).

Figure 16:
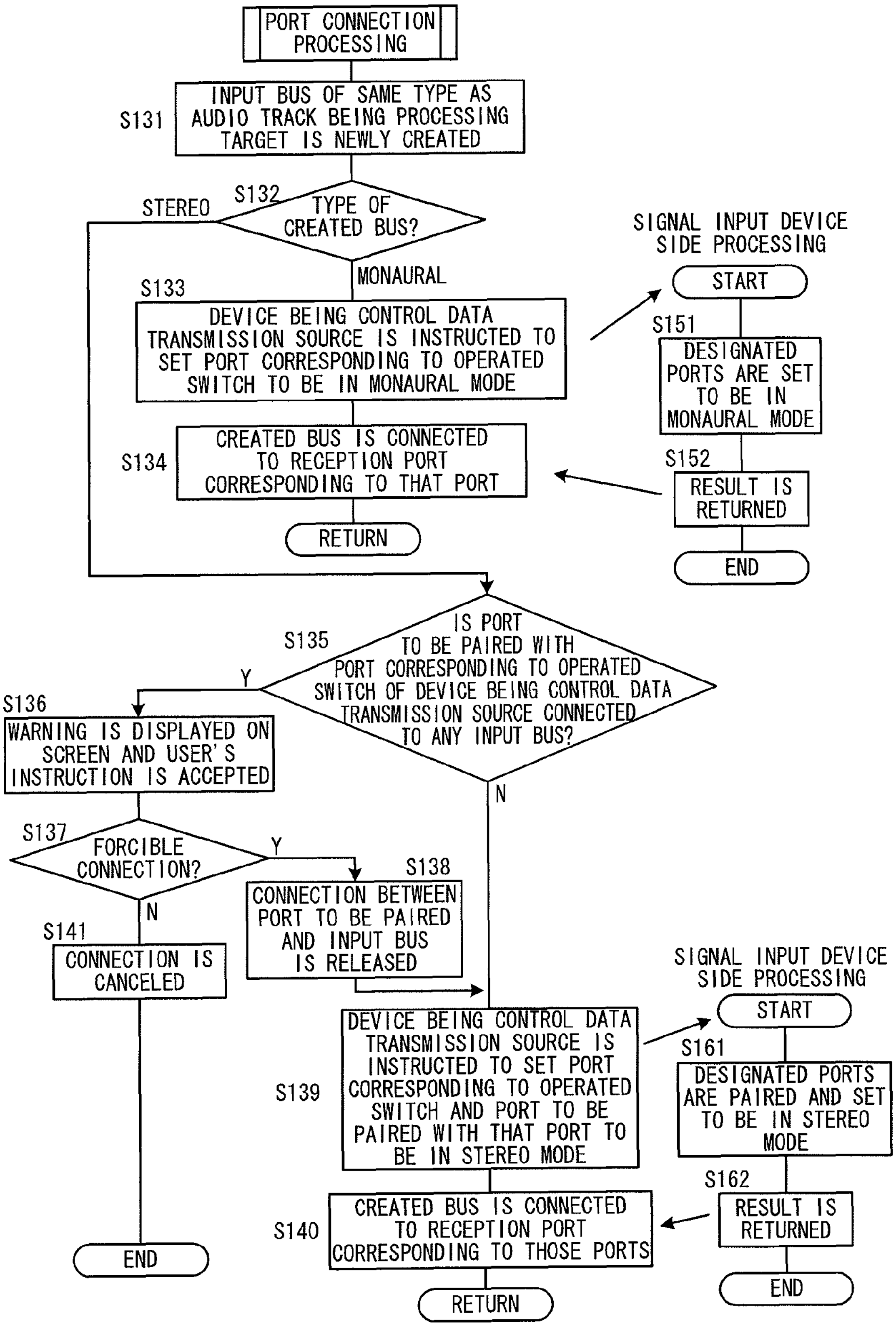
FIG. 16 is a flowchart of port connection processing shown in FIG. 15.

Upon receiving the instruction, the signal input device 30 being the control data transmission source starts processing in a flowchart at the right side of FIG. 16, sets the designated port to be in the monaural mode (S151), and returns a setting result to the DAW application 20 (S152). Note that even if the designated port is originally in a stereo mode and a stereo pair including the designated port is split and both ports are set to be in the monaural mode through the processing in step S151, when there is a connection between the port being the other of the pair and any bus, the connection can be maintained.

Upon receiving the response of the setting result, the CPU 61 connects the bus created in step S131 to a reception port corresponding to the port set to be in the monaural mode (S134), and returns to the processing in FIG. 15.

By the processing so far, it is possible to form a signal transmission path through which waveform data outputted from the port corresponding to the operated switch is inputted into the bus of the DAW application 20.

Meanwhile, when the created bus is a stereo bus in step S132, the CPU 61 discriminates whether or not a port to be paired (stereo pair) with the port corresponding to the operated switch of the device being the control data transmission source is connected to any input bus (S135). If there is a connection, the CPU 61 displays a warning on the screen, and accepts an instruction from a user (S136).

When the port corresponding to the operated switch is in the monaural mode in the signal input device 30, there is a possibility that a port to be paired with the port is connected to some bus while operating in the monaural mode. If the port corresponding to the operated switch is set to be in the stereo mode in such a situation, the connection of the other port of the pair is forcibly released, so that the instruction whether or not such a setting is allowed is accepted in step S136.

Figure 17:
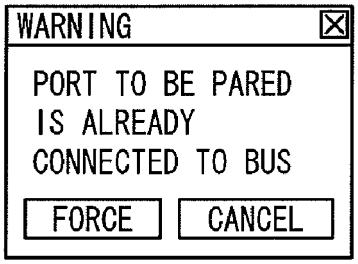
FIG. 17 is a diagram showing an example of a warning screen to be displayed in step S136 in FIG. 16.

FIG. 17 shows an example of this warning screen. On this screen, an instruction indicating force or cancel is accepted.

When the instruction of forcible connection is accepted (YES in S137), the CPU 61 releases the connection between the input bus and the port to be paired with the port corresponding to the operated switch (S138). Thereafter, the CPU 61 instructs the device being the control data transmission source to set the port corresponding to the operated switch and the port to be paired with the port to be in the stereo mode in accordance with the type of the bus (S139).

Upon receiving the instruction, the signal input device 30 being the control data transmission source starts processing in the flowchart at the right side of FIG. 16, sets the designated ports being paired to be in the stereo mode (S161), and returns a setting result to the DAW application 20 (S162).

Upon receiving the response of the setting result, the CPU 61 connects the bus created in step S131 to reception ports corresponding to the ports set to be in the stereo mode (S140), and returns to the processing in FIG. 15.

Also when the stereo bus is created, it is possible to form a signal transmission path through which waveform data outputted from the port corresponding to the operated switch is inputted into the bus of the DAW application 20 by the processing so far.

When the instruction indicating cancel is made on the screen in FIG. 17 (NO in S137), the connection between the port and the bus is not performed (S141). In this case, even if the bus and the track are connected, it is not possible to form a signal transmission path from the port corresponding to the operated switch to the track, so that the processing is terminated without returning to the processing in FIG. 15.

Further, if it is NO in step S135, there is no need to accept the instruction from the user, so that the processing proceeds directly to step S139.

The description will be back to FIG. 15.

When the connection between the port corresponding to the operated switch and the bus can be confirmed in step S113 or the connection can be made in step S114, the processing proceeds to step S115. Through the processing described hereinbelow, the bus (connection destination bus) connected to the port corresponding to the operated switch is connected to the track in the selective state.

In this part of the processing, the CPU 61 first discriminates, based on the audio track data and the input bus data in FIG. 9, whether or not the track being the processing target and the connection destination bus are of the same type (S115). Here, if they are of the same type, there is no problem, and thus the CPU 61 connects the audio track being the processing target to the connection destination bus (S116) by setting a bus ID of the connection destination bus on the input source bus ID of the data of the track being the processing target in FIG. 9. Then, if there are audio tracks in the selected state which are not yet set as the processing target, one of the tracks is set as the next processing target (S120 and S121), and the processing from step S115 is repeated.

On the other hand, if the track and the bus are not of the same type in step S115, the CPU 61 displays a warning screen on the display, and accepts an instruction from a user. When the bus is created in the port connection processing in FIG. 16, there is no chance that the bus differs from the track in the type. However, if it becomes YES in step S113, the type may differ. Further, the warning screen differs depending on whether the track being the processing target is a stereo track or a monaural track.

Figure 18:
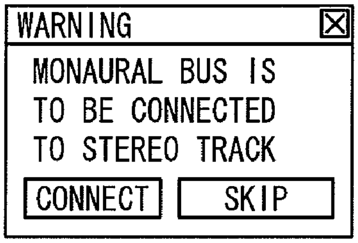
FIG. 18 is a diagram showing an example of a warning screen to be displayed in step S117 in FIG. 15 when a track being a processing target is a stereo track.

FIG. 18 shows a display example when the track is a stereo track.

On this screen, an instruction indicating connection or skip is accepted. When the instruction indicating connection is made on this screen, the processing proceeds from steps S118 to S119, and the CPU 61 connects the audio track being the processing target to the connection destination bus. Note that even if the monaural bus is connected to the stereo track, the same signal is merely recorded in both channels of the track, and no particular problems occur. When the instruction indicating skip is made, the track being the processing target at this time is not connected to the bus, and the processing proceeds to step S120.

Figure 19:
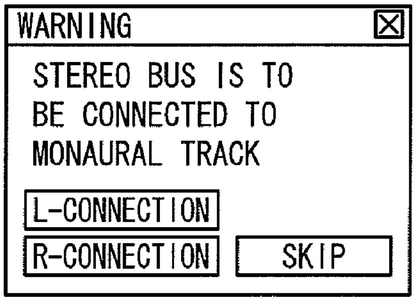
FIG. 19 is a diagram showing an example of a warning screen to be displayed in step S117 in FIG. 15 when the track being the processing target is a monaural track.

FIG. 19 shows a display example when the track is a monaural track.

On this screen, an instruction indicating L connection, R connection or skip is accepted. When a stereo bus is connected to the monaural track, only a signal of either channel of L and R is inputted into the track, so that a user selects, if the connection is made, a signal of which channel is to be inputted.

When the instruction indicating L connection or R connection is made on this screen, the processing proceeds from steps S118 to S119, and the CPU 61 connects audio track being the processing target to the connection destination bus in accordance with the instructed contents. When the instruction indicating skip is made, the track is not connected to the bus and the processing proceeds to step S120, similar to the aforementioned case of monaural track.

When the processing with respect to all of the audio tracks in the selected state is completed by repeating the processing in steps S115 to S121, it becomes NO in step S120, and the processing in FIG. 15 is terminated.

In the aforementioned processing, the CPU 31 serves as an operation contents transmitter in step S101. Further, the CPU 61 serves as a first setting device in a case of YES in step S113, and it serves as a second setting device in a case of NO in step S113.

The aforementioned processing executed by the CPUs enables a user, by merely selecting a track to be used for recording and pressing a button corresponding to a port from which a signal is supplied to the track at the signal input device 30 side, to automatically set a transmission path transmitting the signal between the port and the track. Therefore, even when a virtual bus is used and a transmission path becomes complicated, it is possible to conduct a setting of the transmission path with simple operation.

The above is the description of this embodiment. It is needless to say that the invention should not be limited to the above-described configuration of system and device, screen configuration, data configuration, concrete processing steps, operation method and the like.

Figure 20:
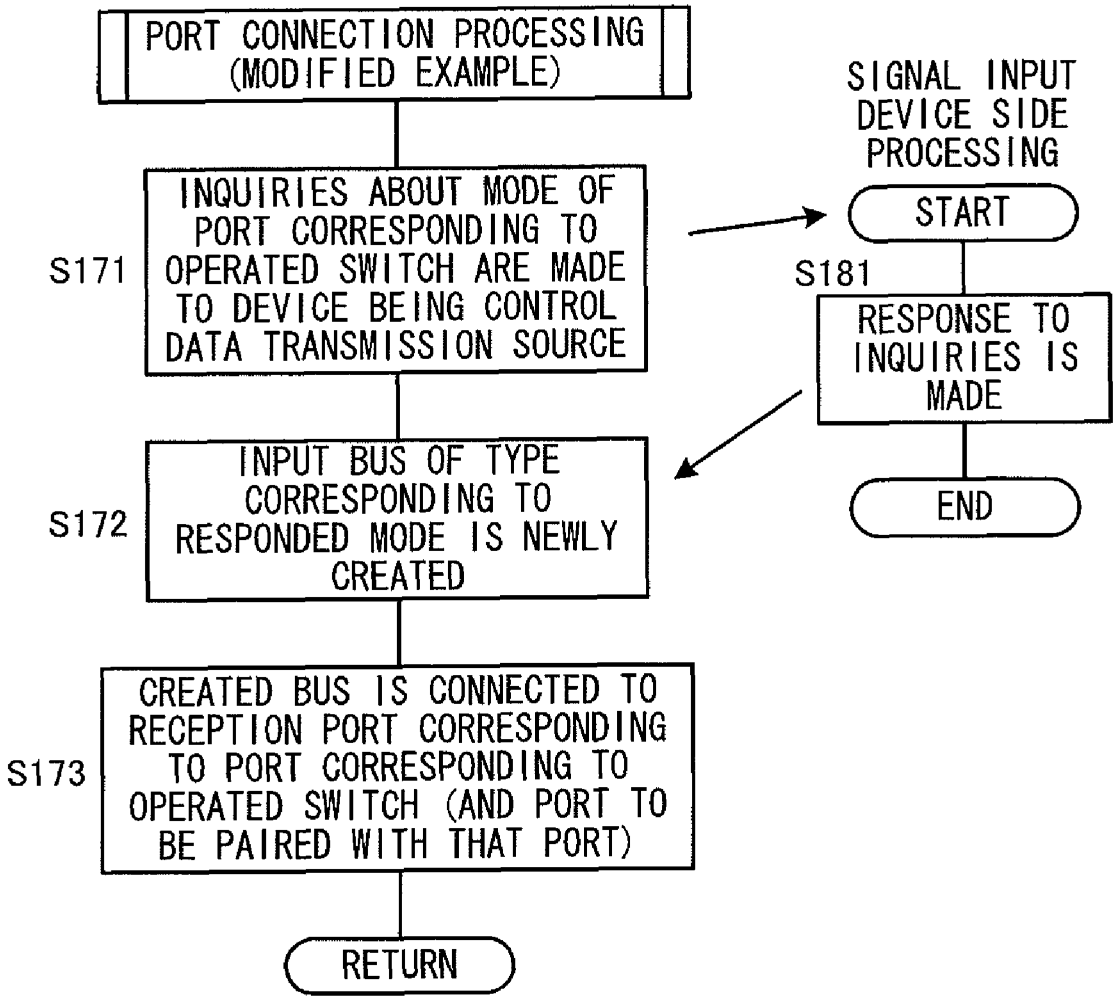
FIG. 20 is a flowchart showing a modified example of the port connection processing shown in FIG. 16.

For example, in step S114 in FIG. 15, the port connection processing shown in FIG. 20 may be conducted instead of the port connection processing shown in FIG. 16.

When this processing is performed, the CPU 61 first makes inquiries to the device being the control data transmission source about a mode of the port corresponding to the operated switch (S171). Subsequently, when a response to the inquiries is returned from the signal input device 30 being the control data transmission source (S181), the CPU 61 newly creates an input bus of a type (monaural/stereo) corresponding to the responded mode (S172). Thereafter, the CPU 61 connects the created bus to a reception port corresponding to the port corresponding to the operated switch (S173), and returns to the processing in FIG. 15. If the bus is a stereo bus, the bus is also connected to a reception port corresponding to a port to be paired with the port corresponding to the operated switch.

The type of the newly created bus is decided based on the type of the track to be connected in the processing shown in FIG. 16, but, it is decided based on the mode of the port of the connection destination in the processing in FIG. 20. The processing in FIG. 20 is preferable since at least the connection between the port and the bus can be surely conducted. However, regarding the point where it is easy to decide the type of the newly created bus to a user's satisfaction, the processing in FIG. 16 is preferable.

Note that to change the mode of the port at the signal input device 30 side in the processing shown in FIG. 16 is not a must. The bus and the port can be connected without matching the modes at the bus side and at the port side.

Although one reception port can be connected to only one bus in the aforementioned embodiment, it may be possible to connect one reception port to a plurality of buses, as another modification. Also in this case, it is possible to follow the arrow in the opposite direction along the transmission path shown in FIG. 5, and by executing the processing described in the aforementioned embodiment in the same manner, the same effect can be obtained.

It is also possible to design such that one reception port can be connected to one bus for each type which can be used. An example of the above is that a port connected to a certain monaural bus can be connected to a stereo bus, although it cannot be connected to another monaural bus.

In this case, if the connection relation between the port and the bus is fixed, it becomes easy to manage the signal transmission path. For example, first to eighth reception ports receiving waveform data from a certain device are respectively connected to first to eighth monaural buses, and two of the reception ports are sequentially paired from the low-numbered one, and connected to first to fourth stereo buses.

If such a connection form is applied, by appropriately connecting the bus and the track, it is possible to obtain almost the same effect as in the case where the connection relation between the port and the bus is freely discriminated, in terms of inputting waveform data outputted from a desired port of a signal input device into a desired track.

If the connection relation between the port and the bus is fixed, even when a bus and a track which input multichannel surround audio such as 4-channel, 5.1-channel, 6.1-channel are provided, it is possible to easily manage the connection relation between the port and the bus.

Figure 21:
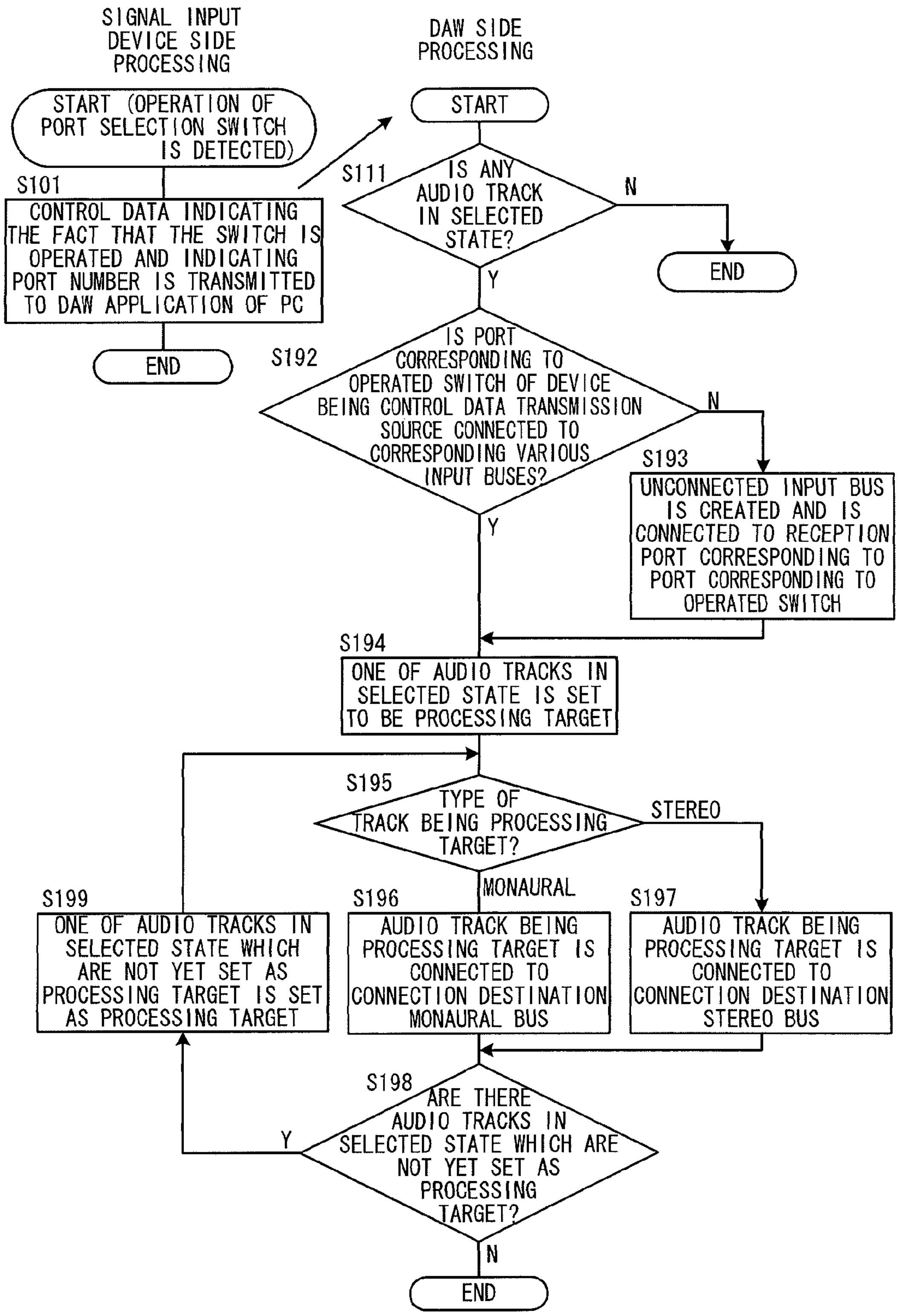
FIG. 21 is a flowchart showing a modified example of the processing shown in FIG. 15.

Further, if the connection relation between the port and the bus is fixed, as processing to be executed when the port selection switch is operated in the signal input device, the processing shown in FIG. 21 may be executed instead of the processing shown in FIG. 15.

Also in this processing, the processing at the signal input device 30 side and the processing in step S111 at the DAW application 20 side are performed in the same manner as in the case of FIG. 15. Subsequently, if it is YES in step S111, the CPU 61 discriminates whether or not the port corresponding to the operated switch in the device being the control data transmission source is connected to the corresponding various input buses (both the monaural bus and the stereo bus, for instance) via reception ports of the PC 10 (S192). If the port is not connected to at least one type of the buses, the CPU 61 creates the unconnected corresponding input bus and connects the created bus to a reception port corresponding to the port corresponding to the operated switch (S193). At this time, there is no need to consider the mode of the port at the signal input device 30 side.

Subsequently, in either case, while sequentially setting respective audio tracks in the selected state as the processing target (S194, S198 and S199), the CPU 61 connects the track being the processing target to the bus of the same type which is connected to the port corresponding to the operated switch (S195 to S197).

Also by the aforementioned processing, it is possible to obtain at least the same effect as in the case of the processing shown in FIG. 15.

Other than the aforementioned modification, it is also possible to apply a configuration in which a bus and a track which input multichannel surround audio such as 4-channel, 5.1-channel, 6.1-channel can be formed, together with the configuration in which one reception port is connected to only one bus as described in the aforementioned embodiment. It is of course possible to form buses and tracks of three types or more. Also in the above cases, the processing described using FIG. 10 to FIG. 21 can be similarly applied. A monaural bus and a monaural track can be handled in the same manner, and a surround bus/track (stereo is also a kind of surround) can be handled in a manner similar to the case of the stereo bus according to the number of channels.

In the aforementioned embodiment, a case of using the virtual bus function is described. However, the processing relating to the lighting control of the lamp shown in FIG. 10, FIG. 13 and FIG. 14 can be applied similarly to the case where the virtual bus function is not used, namely, the case where the track is directly connected to the reception port. The search processing conducted in step S19 or the like is for specifying the signal input device and its transmission port being supply sources of waveform data inputted into the track, and the search can be conducted also in a case where no bus is interposed between the track and the port.

Although an example of using a lamp as an indicator corresponding to a port in the signal input device 30 is described, it is of course possible to use, other than the lamp, a segment type display panel or a dot matrix type display panel. Further, it is needless to say that the display indicating the state of port can be performed not only by lighting-on, lighting-off or blinking the lamp, but also by using a lighting color of the lamp, a figure, a character or the like.

Further, the controls or lamps do not have to physically exist independently and can be displayed on a screen using a touch panel and a display.

In the aforementioned embodiment, the signal input device 30 outputs audio signals inputted from terminals through output ports corresponding to the respective terminals, in which a part of the audio signal outputted from the output port may be a reproduced signal previously recorded in a recording medium built in the device. Further, the correspondence between the terminal and the port does not always have to be one-to-one.

The signal input device 30 may be an audio signal processing device such as a recorder, an effector, a synthesizer and a tone generator to which a waveform data transmitting function is provided.

Further, instead of the PC executing the DAW application, it is also possible to use a device such as a digital mixer configured using dedicated hardware as an audio signal processing device to which a function to perform control of lamps or to set signal transmission paths as described above is provided.

In addition, a plurality of different models of signal input devices may be connected to the PC 10. An arbitrary transmission method between the signal input device and the audio signal processing device can be applied regardless of wire or wireless as long as a real time transmission of waveform data is possible.

The program to cause a computer to function as an audio signal processing device and realize the above-described functions can be previously stored in a ROM, a HDD and the like or recorded in a nonvolatile recording medium (memory) such as a CD-ROM or a flexible disk and read to a RAM from the memory so that the CPU can execute the program. The program can be downloaded from an external device including a recording medium recording the program or an external device storing the program in its memory such as an HDD. The same effect can be obtained in any of the above method.

Further, the configurations and the modified examples described above are applicable in any combination in a range without contradiction.

As seen in the above description, according to the audio signal processing system or the computer readable medium of this invention, even when audio signals transmitted from an external device are recorded in a plurality of tracks of an audio signal processing device, it is possible to easily recognize a correspondence between the tracks and the device being a signal supply source.

Therefore, an application of this invention provides an audio signal processing system with an improved operability.

What is claimed is:

1. An audio signal processing system comprising:

a signal input device that inputs a plurality of audio signals from outside and transmits said plurality of audio signals to an audio signal processing device through a plurality of transmission ports in said signal input device; and an audio signal processing device comprising: a plurality of reception ports each of which receives an audio signal transmitted from said signal input device; a plurality of buses each of which is connected to one of said plurality of reception ports and inputs the audio signal received by said one reception port; and a plurality of tracks each of which records the audio signal supplied from one of said plurality of buses, wherein said signal input device further comprising:

display devices corresponding to said plurality of transmission ports; and a display controller that controls said display devices according to control data received from said audio signal processing device, and wherein said audio signal processing device further comprising:

a memory that stores data indicating, regarding each one of said plurality of buses, one of said plurality of reception ports to which the one bus is connected, and one transmission port of said input device through which an audio signal received by the one reception port is transmitted by said input device;

a selecting device that selects one of said plurality of the tracks according to an operation by a user;

a searching device that, when said selecting device selects a track, searches any one bus which supplies the audio signal to the selected track; and a control data transmitter that, when said searching device finds a bus which supplies the audio signal to the selected track, judges if a reception port connected to the found bus receives an audio signal transmitted through one transmission port of said signal input device or not based on the data stored in said memory and, when the judgment is affirmative, transmits, to said signal input device, first control data which instructs said display controller in said signal input device to control one of said display devices corresponding to the one transmission port to indicate that the one transmission port is connected to the selected track, wherein said audio signal processing device further comprising:

a loading device that reads a project data including data of tracks and setting data of reception ports and buses, prepares the tracks, the reception ports, and the buses which connects the tracks and the reception ports based on the read project data;

a second searching device that, when said loading device prepares said tracks, said reception ports, and said buses, searches any buses which supply audio signals to the prepared tracks; and a second control data transmitter that, when said second searching device finds one or more buses, judges if one or more reception ports connected to the found buses receive one or more audio signals transmitted through one or more transmission port of said signal input device or not based on the data stored in said memory and, when the judgment is affirmative, transmits, to said signal input device, second control data which instructs said display controller in said signal input device to control one or more display devices corresponding to the one or more transmission ports to indicate that the one or more transmission ports are connected to the prepared tracks.

2. An audio signal processing system comprising:

a signal input device that inputs a plurality of audio signals from outside and transmits said plurality of audio signals to an audio signal processing device through a plurality of transmission ports in said signal input device; and an audio signal processing device comprising: a plurality of reception ports each of which receives an audio signal transmitted from said signal input device; a plurality of buses each of which is connected to one of said plurality of reception ports and inputs the audio signal received by said one reception port; and a plurality of tracks each of which records the audio signal supplied from one of said plurality of buses, wherein said signal input device further comprising:

display devices corresponding to said plurality of transmission ports; and a display controller that controls said display devices according to control data received from said audio signal processing device, and wherein said audio signal processing device further comprising:

a memory that stores data indicating, regarding each one of said plurality of buses, one of said plurality of reception ports to which the one bus is connected, and one transmission port of said input device through which an audio signal received by the one reception port is transmitted by said input device;

a selecting device that selects one of said plurality of the tracks according to an operation by a user;

a searching device that, when said selecting device selects a track, searches any one bus which supplies the audio signal to the selected track; and a control data transmitter that, when said searching device finds a bus which supplies the audio signal to the selected track, judges if a reception port connected to the found bus receives an audio signal transmitted through one transmission port of said signal input device or not based on the data stored in said memory and, when the judgment is affirmative, transmits, to said signal input device, first control data which instructs said display controller in said signal input device to control one of said display devices corresponding to the one transmission port to indicate that the one transmission port is connected to the selected track, wherein said audio signal processing device further comprising:

a changing device that changes an audio signal supply source for a track from one bus to another bus according to a user operation by stopping the one bus from supplying an audio signal to the track and start the other bus supplying an audio signal to the track; and a third control data transmitter that, in response to the change of the audio signal supply source for the track by said changing device, (a) judges, based on the data stored in said memory, if the one bus is connected to any reception port receiving an audio signal transmitted through a first transmission port of said signal input device or not and if the one bus no longer supplies the audio signal to any of said plurality of tracks after the change or not, and, when both of the two judgments are affirmative, transmits, to said signal input device, third control data which instructs said display controller in said signal input device to control one of said display devices corresponding to the first transmission port to indicate that the first transmission port is no longer connected to any of said tracks, and (b) judges, based on the data stored in said memory, if the other bus is connected to any reception port receiving an audio signal transmitted through a second transmission port of said signal input device or not, and, when the judgment is affirmative, transmits, to said signal input device, fourth control data which instructs said display controller in said signal input device to control one of said display devices corresponding to the second transmission port to indicate that the second transmission port is newly connected to the track.

3. An audio signal processing system comprising:

a signal input device that inputs a plurality of audio signals from outside and transmits said plurality of audio signals to an audio signal processing device through a plurality of transmission ports in said signal input device; and an audio signal processing device comprising: a plurality of reception ports each of which receives an audio signal transmitted from said signal input device; a plurality of buses each of which is connected to one of said plurality of reception ports and inputs the audio signal received by said one reception port; and a plurality of tracks each of which records the audio signal supplied from one of said plurality of buses, wherein said signal input device further comprising:

controls corresponding to each of said plurality of transmission ports in said signal input device; and an operation data transmitter that, in response to an operation on one of said controls by a user, transmits operation data indicating the operation on said one control, and wherein said audio signal processing device further comprising:

a selecting device that selects one of said plurality of the tracks according to an operation by a user;

a searching device that, when receiving, from said signal input device, said operation data indicating an operation on one control corresponding to one transmission port while one of said plurality of tracks is selected by said selecting device, searches any one bus connected to any one reception port which receives the audio signal transmitted through said one transmission port in said signal input device, among said buses existing at the moment;

a first setting device that, when said searching device finds an existing bus connected to a reception port which receives the audio signal transmitted through said one transmission port in said signal input device, connects the selected track to the found bus to supply the audio signal from said one transmission port in said signal input device to the selected track; and a second setting device that, when said searching device cannot find an existing bus, newly creates a bus, connects the created bus to a reception port which receives the audio signal transmitted through said one transmission port in said signal input device, and connects the selected track to the created bus to supply the audio signal from said one transmission port in said signal input device to the selected track.

4. An audio signal processing system comprising:

a signal input device that inputs a plurality of audio signals from outside and transmits said plurality of audio signals to an audio signal processing device through a plurality of transmission ports in said signal input device, some of said plurality of transmission ports are solely set in monaural mode and others of said plurality of transmission ports are paired and set in stereo mode, a monaural audio signal being transmitted through the port in the monaural mode, while two audio signals in stereo being transmitted through the paired transmission ports in the stereo mode; and an audio signal processing device comprising: a plurality of reception ports each of which receives an audio signal transmitted from said signal input device; a plurality of monaural buses each of which is connected to one of said plurality of reception ports and inputs one audio signal transmitted through said port in the monaural mode and received by said one reception port; a plurality of stereo buses each of which is connected to two of said plurality of reception ports and input two audio signals transmitted through said paired transmission ports in the stereo mode and received by said two reception ports; a plurality of monaural tracks each of which records one audio signal supplied from one of said plurality of monaural buses; and a plurality of stereo tracks each of which records two audio signals supplied from one of said plurality of stereo buses, wherein said signal input device further comprising:

controls corresponding to each of said plurality of transmission ports in said signal input device; and an operation data transmitter that, in response to an operation on one of said controls by a user, transmits operation data indicating the operation on said one control, and wherein said audio signal processing device further comprising:

a selecting device that selects one of said monaural tracks and said stereo tracks according to an operation by a user;

a first searching device that, when receiving, from said signal input device, said operation data indicating an operation on one control corresponding to one transmission port while one of said monaural tracks is selected by said selecting device, searches any one monaural bus connected to any one reception port which receives the audio signal transmitted through said one transmission port in said signal input device, among said monaural buses existing at the moment;

a first setting device that, when said searching device finds a monaural bus connected to a reception port which receives the audio signal transmitted through said one transmission port in said signal input device, connects the selected monaural track to the found monaural bus to supply the audio signal from said one transmission port in said signal input device to the selected monaural track;

a second setting device that, when said searching device cannot find a monaural bus, newly creates a monaural bus, instructs said input device to set said one transmission port in the monaural mode, connects the created monaural bus to a reception port which receives the audio signal transmitted through said one transmission port in said signal input device, and connects the selected monaural track to the created monaural bus to supply the audio signal from said one transmission port in said signal input device to the selected monaural track;

a second searching device that, when receiving, from said signal input device, said operation data indicating an operation on one control corresponding to one transmission port while one of said stereo tracks is selected by said selecting device, searches any one stereo bus connected to any two reception ports which receive the audio signal transmitted through paired transmission ports including said one transmission port in said signal input device, among said stereo buses existing at the moment;

a third setting device that, when said searching device finds a stereo bus connected two reception ports which receive the two audio signals transmitted through said paired transmission ports in said signal input device, connects the selected stereo track to the found stereo bus to supply the two audio signals from said paired transmission port in said signal input device to the selected stereo track; and a fourth setting device that, when said searching device cannot find a stereo bus, newly creates a stereo bus, instructs said input device to pair said one transmission port with another transmission port and to set the paired transmission ports in the stereo mode, connects the created stereo bus to two reception ports which receive the two audio signals transmitted through the paired transmission ports in said signal input device, and connects the selected stereo track to the created stereo bus to supply the two audio signals from the paired transmission ports in said signal input device to the selected stereo track.

5. An audio signal processing system according to claim 4, wherein, in a case where an audio signal transmitted from said another transmission port to be paired with said one transmission port in said signal input device is already inputted to any of said monaural buses, said fourth setting device does not operate.

6. An audio signal processing system comprising:

a signal input device that inputs a plurality of audio signals from outside and transmits said plurality of audio signals to an audio signal processing device through a plurality of transmission ports in said signal input device, some of said plurality of transmission ports are solely set in monaural mode and others of said plurality of transmission ports are paired and set in stereo mode, a monaural audio signal being transmitted through the port in the monaural mode, while two audio signals in stereo being transmitted through the paired transmission ports in the stereo mode; and an audio signal processing device comprising: a plurality of reception ports each of which receives an audio signal transmitted from said signal input device; a plurality of monaural buses each of which is connected to one of said plurality of reception ports and inputs one audio signal transmitted through said port in the monaural mode and received by said one reception port; a plurality of stereo buses each of which is connected to two of said plurality of reception ports and input two audio signals transmitted through said paired transmission ports in the stereo mode and received by said two reception ports; a plurality of monaural tracks each of which records one audio signal supplied from one of said plurality of monaural buses; and a plurality of stereo tracks each of which records two audio signals supplied from one of said plurality of stereo buses, wherein said signal input device further comprising:

controls corresponding to each of said plurality of transmission ports in said signal input device; and an operation data transmitter that, in response to an operation on one of said controls by a user, transmits operation data indicating the operation on said one control, and wherein said audio signal processing device further comprising:

a selecting device that selects one of said monaural tracks and said stereo tracks according to an operation by a user; a searching device that, when receiving, from said signal input device, said operation data indicating an operation on one control corresponding to one certain transmission port while one of said monaural tracks and said stereo tracks is selected by said selecting device, searches any one monaural bus or stereo bus connected to any one or two reception ports which receives the one or two audio signals transmitted through said one transmission port or said paired transmission ports including said one transmission port in said signal input device, among said monaural buses and said stereo buses existing at the moment;

a first setting device that, when said searching device finds a monaural or stereo bus connected one or two reception ports which receives the one or two audio signals transmitted through said one transmission port or said paired transmission ports in said signal input device, connects the selected one track to the found monaural or stereo bus to supply the one or two audio signals from said one transmission port or said paired transmission ports in said signal input device to the selected one track; and a second setting device that, when said searching device cannot find a monaural or stereo bus, newly creates a monaural or stereo bus, connects the created monaural or stereo bus to one or two reception ports which receives the audio signal transmitted through said one transmission port or the paired two transmission ports in said signal input device, and connects the selected one track to the created monaural or stereo bus to supply the one or two audio signals from said one transmission port or the paired transmission ports in said signal input device to the selected one track, wherein the monaural bus being created in case where the one certain transmission port is in the monaural mode while the stereo bus being created in case where the one certain transmission port is paired with another transmission port and in the stereo mode.

7. A non-transitory machine-readable medium containing program instructions executable by a computer and causing the computer to function as:

a plurality of reception ports each of which receives an audio signal transmitted from said signal input device;

a plurality of buses each of which is connected to one of said plurality of reception ports and inputs the audio signal received by said one reception port;

a plurality of tracks each of which records the audio signal supplied from one of said plurality of buses, a memory that stores data indicating, regarding each one of said plurality of buses, one of said plurality of reception ports to which the one bus is connected, and one transmission port of an input device through which an audio signal received by the one reception port is transmitted by said input device;

a selecting device that selects one of said plurality of the tracks according to an operation by a user;

a searching device that, when said selecting device selects a track, searches any one bus which supplies the audio signal to the selected track;

a control data transmitter that, when said searching device finds a bus which supplies the audio signal to the selected track, judges if a reception port connected to the found bus receives an audio signal transmitted through one transmission port of said signal input device or not based on the data stored in said memory and, when the judgment is affirmative, transmits, to said signal input device, first control data which instructs a display controller in said signal input device to control a display device corresponding to the one transmission port to indicate that the one transmission port is connected to the selected track;

a loading device that reads a project data including data of tracks and setting data of reception ports and buses, prepares the tracks, the reception ports, and the buses which connects the tracks and the reception ports based on the read project data;

a second searching device that, when said loading device prepares said tracks, said reception ports, and said buses, searches any buses which supply audio signals to the prepared tracks; and a second control data transmitter that, when said second searching device finds one or more buses, judges if one or more reception ports connected to the found buses receive one or more audio signals transmitted through one or more transmission port of said signal input device or not based on the data stored in said memory and, when the judgment is affirmative, transmits, to said signal input device, second control data which instructs said display controller in said signal input device to control one or more display devices corresponding to the one or more transmission ports to indicate that the one or more transmission ports are connected to the prepared tracks.

8. A non-transitory machine-readable medium containing program instructions executable by a computer and causing the computer to function as:

a plurality of reception ports each of which receives an audio signal transmitted from said signal input device;

a plurality of buses each of which is connected to one of said plurality of reception ports and inputs the audio signal received by said one reception port;

a plurality of tracks each of which records the audio signal supplied from one of said plurality of buses, a memory that stores data indicating, regarding each one of said plurality of buses, one of said plurality of reception ports to which the one bus is connected, and one transmission port of an input device through which an audio signal received by the one reception port is transmitted by said input device;

a selecting device that selects one of said plurality of the tracks according to an operation by a user;

a searching device that, when said selecting device selects a track, searches any one bus which supplies the audio signal to the selected track;

a control data transmitter that, when said searching device finds a bus which supplies the audio signal to the selected track, judges if a reception port connected to the found bus receives an audio signal transmitted through one transmission port of said signal input device or not based on the data stored in said memory and, when the judgment is affirmative, transmits, to said signal input device, first control data which instructs a display controller in said signal input device to control a display device corresponding to the one transmission port to indicate that the one transmission port is connected to the selected track;

a changing device that changes an audio signal supply source for a track from one bus to another bus according to a user operation by stopping the one bus from supplying an audio signal to the track and start the other bus supplying an audio signal to the track; and a third control data transmitter that, in response to the change of the audio signal supply source for the track by said changing device, (a) judges, based on the data stored in said memory, if the one bus is connected to any reception port receiving an audio signal transmitted through a first transmission port of said signal input device or not and if the one bus no longer supplies the audio signal to any of said plurality of tracks after the change or not, and, when both of the two judgments are affirmative, transmits, to said signal input device, third control data which instructs said display controller in said signal input device to control one of said display devices corresponding to the first transmission port to indicate that the first transmission port is no longer connected to any of said tracks, and (b) judges, based on the data stored in said memory, if the other bus is connected to any reception port receiving an audio signal transmitted through a second transmission port of said signal input device or not, and, when the judgment is affirmative, transmits, to said signal input device, fourth control data which instructs said display controller in said signal input device to control one of said display devices corresponding to the second transmission port to indicate that the second transmission port is newly connected to the track.

9. A non-transitory machine-readable medium containing program instructions executable by a computer and causing the computer to function as:

a plurality of reception ports each of which receives an audio signal transmitted from said signal input device;

a plurality of buses each of which is connected to one of said plurality of reception ports and inputs the audio signal received by said one reception port;

a plurality of tracks each of which records the audio signal supplied from one of said plurality of buses;

a selecting device that selects one of said plurality of the tracks according to an operation by a user;

a searching device that, when receiving, from an signal input device which transmits a plurality of audio signals to the computer through a plurality of transmission ports in said signal input device, an operation data indicating an operation on one control corresponding to one transmission port while one of said plurality of tracks is selected by said selecting device, searches any one bus connected to any one reception port which receives the audio signal transmitted through said one transmission port in said signal input device, among said buses existing at the moment;

a first setting device that, when said searching device finds an existing bus connected to a reception port which receives the audio signal transmitted through said one transmission port in said signal input device, connects the selected track to the found bus to supply the audio signal from said one transmission port in said signal input device to the selected track; and a second setting device that, when said searching device cannot find an existing bus, newly creates a bus, connects the created bus to a reception port which receives the audio signal transmitted through said one transmission port in said signal input device, and connects the selected track to the created bus to supply the audio signal from said one transmission port in said signal input device to the selected track.

* * * * *